United States Patent
Liu et al.

(10) Patent No.: US 11,812,461 B2
(45) Date of Patent: Nov. 7, 2023

(54) COMMUNICATION METHOD AND RELATED DEVICE

(71) Applicant: HUAWEI TECHNOLOGIES CO., LTD., Guangdong (CN)

(72) Inventors: Hang Liu, Beijing (CN); Mingchao Li, Beijing (CN); Xiao Xiao, Beijing (CN); Hejun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 17/029,894

(22) Filed: Sep. 23, 2020

(65) Prior Publication Data

US 2021/0007118 A1 Jan. 7, 2021

Related U.S. Application Data

(63) Continuation of application No. PCT/CN2019/078898, filed on Mar. 20, 2019.

(30) Foreign Application Priority Data

Mar. 27, 2018 (CN) .......................... 201810260631.5

(51) Int. Cl.
*H04W 72/12* (2023.01)
*H04W 72/543* (2023.01)
(Continued)

(52) U.S. Cl.
CPC ..... *H04W 72/543* (2023.01); *H04W 72/1263* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 2011/0205997 A1* | 8/2011 | Chun | H04L 5/0007 370/329 |
| 2011/0222499 A1* | 9/2011 | Park | H04W 72/0413 370/329 |

(Continued)

FOREIGN PATENT DOCUMENTS

| | | |
|---|---|---|
| CN | 101048982 A | 10/2007 |
| CN | 103313396 A | 9/2013 |

(Continued)

OTHER PUBLICATIONS

Huawei. HiSilicon, "Support of QoS for PC5-based V2Vtransport," 3GPP TSG-RAN WG2 Meeting #93bis, R2-162286, Dubrovnik, Croatia, Apr. 11-15, 2016, 6 pages.

(Continued)

*Primary Examiner* — Kodzovi Acolatse
(74) *Attorney, Agent, or Firm* — Fish & Richardson P.C.

(57) ABSTRACT

The present disclosure relates to communication methods and related devices. One example method is applied to a terminal device, and the method includes obtaining first data and a quality of service (QoS) parameter corresponding to the first data, where the QoS parameter includes at least one of reliability information, latency information, communication distance information, data rate information, or service type information, and sending an identifier to a network device, where the identifier corresponds to the QoS parameter.

20 Claims, 9 Drawing Sheets

(51) Int. Cl.
*H04W 72/1263* (2023.01)
*H04W 72/21* (2023.01)
*H04W 72/23* (2023.01)

(56) References Cited

U.S. PATENT DOCUMENTS

| | | | | |
|---|---|---|---|---|
| 2015/0281999 A1* | 10/2015 | Zhu | ..................... | H04L 47/2441 370/329 |
| 2018/0049227 A1* | 2/2018 | Moon | ............... | H04W 72/1284 |
| 2018/0324631 A1* | 11/2018 | Jheng | ................ | H04W 28/0268 |
| 2018/0324673 A1* | 11/2018 | Ozturk | .................. | H04W 48/10 |
| 2019/0049227 A1 | 2/2019 | Rioux et al. | | |
| 2019/0059019 A1* | 2/2019 | Wallentin | ................ | H04W 4/40 |
| 2019/0104530 A1* | 4/2019 | Deng | .................... | H04W 8/245 |
| 2019/0150176 A1* | 5/2019 | Pelletier | ............ | H04W 72/0453 370/329 |
| 2020/0092685 A1* | 3/2020 | Fehrenbach | ............ | H04W 4/46 |
| 2020/0267753 A1* | 8/2020 | Adjakple | ............... | H04W 72/14 |
| 2020/0288436 A1* | 9/2020 | Byun | .................... | H04L 5/0091 |
| 2022/0061055 A1* | 2/2022 | Freda | ................ | H04W 72/1263 |

FOREIGN PATENT DOCUMENTS

| | | |
|---|---|---|
| CN | 106470384 A | 3/2017 |
| CN | 106550457 A | 3/2017 |
| CN | 107580340 A | 1/2018 |
| CN | 107734564 A | 2/2018 |
| EP | 3244677 A1 | 11/2017 |
| KR | 20160028446 A | 3/2016 |
| KR | 20180018268 A | 2/2018 |
| RU | 2643349 C1 | 2/2018 |
| WO | 2016186268 A1 | 11/2016 |
| WO | 2017158515 A1 | 9/2017 |
| WO | 2017206168 A1 | 12/2017 |
| WO | 2018030710 A1 | 2/2018 |
| WO | 2018031143 A1 | 2/2018 |

OTHER PUBLICATIONS

Office Action issued in Chinese Application No. 201810260631.5 dated Mar. 19, 2021, 9 pages.
Intel Corporation, "Scheduling request design for NR," 3GPP TSG-RAN WG1 #87, R1-1611998, Reno, USA, Nov. 14-18, 2016, 4 pages.
Huawei, HiSilicon, "Support of QoS for PC5-based V2X transport," 3GPP TSG-RAN WG2 Meeting #95, R2-164917, Gothenburg, Sweden, Aug. 22-26, 2016, 6 pages.
PCT International Search Report and Written Opinion issued in International Application No. PCT/CN2019/078898 dated Jun. 12, 2019, 19 pages (with English translation).
Extended European Search Report issued in European Application No. 19778266.7 dated Feb. 19, 2021, 9 pages.
Orfanos, "Development and Performance Evaluation of an MAC Protocol for MC-CDMA Wireless LANs with QoS Support, Centralized Mode of the C-DCF", Electrical Engineering and Information Technology Dissertation, RWTH Aachen University, Jun. 2006, 9 pages.
Office Action issued in Russian Application No. 2020134971/07(064222) dated Jul. 20, 2022, 12 pages (with English translation).
3GPP TS 23.285 V0.2.0 (Sep. 2016), "3rd Generation Partnership Project; Technical Specification Group Services and System Aspects; Architecture enhancements for V2X Services (Release 14)," Sep. 2016, 27 pages.
KT Corp., "NR BSR Formats," 3GPP TSG-RAN WG2 #99, R2-1709240, Berlin, Germany, Aug. 21-25, 2017, 2 pages.
Office Action issued in Korean Application No. 2020-7029738 dated Oct. 28, 2022, 4 pages (with English translation).
Oppo, "Discussion on BSR Format," 3GPP TSG-RAN2 AH2, R2-1706357, Qingdao, China, Jun. 27-29, 2017, 2 pages.
Panasonic, "Clarification of Antenna Port Usage of NB-Iot," 3GPP TSG RAN WG1 Meeting #85, R1-164917, Nanjing, China, May 23-27, 2016, 2 pages.
3GPP TS 23.285 V15.0.0 (Mar. 2018), "3rd Generation Partnership Project; Technical Specification Group Services and System Aspects; Architecture enhancements for V2X services (Release 15)," Mar. 2018, 36 pages.
LG Electronics et al., "New QCI values for V2X services," SA WG2 Meeting #116BIS, S2-164915, Sanya, P.R. China, Aug. 29-Sep. 2, 2016, 7 pages.
Office Action issued in Korean Application No. 2020-7029738 dated Apr. 29, 2022, 10 pages (with English translation).

\* cited by examiner

COMMUNICATION METHOD AND RELATED DEVICE

CROSS-REFERENCE TO RELATED APPLICATIONS

This application is a continuation of International Application No. PCT/CN2019/078898, filed on Mar. 20, 2019, which claims priority to Chinese Patent Application No. 201810260631.5, filed on Mar. 27, 2018. The disclosures of the aforementioned applications are hereby incorporated by reference in their entireties.

TECHNICAL FIELD

The present invention relates to the field of terminal technologies, and in particular, to a communication method and a related device.

BACKGROUND

V2X (vehicle to X) is a key technology of an intelligent transportation system. The V2X includes vehicle to vehicle (vehicle to vehicle, V2V), vehicle to infrastructure (vehicle to infrastructure, V2I), vehicle to network (vehicle to network, V2N), and vehicle to pedestrian (vehicle to pedestrian, V2P). The intelligent transportation system (intelligent transportation system, ITS) aims to obtain a series of traffic information such as a real-time road condition, road information, and pedestrian information through V2X communication, thereby improving road safety, improving transportation efficiency, and providing rich streaming media services for users.

The intelligent transportation system has a strict requirement on low-latency and high-reliable communication. A 3rd generation partnership project (3rd generation partnership project, 3GPP) cellular technology is, for example, 2G, 3G, long term evolution (long term evolution, LTE), or 5G. The 3GPP cellular technology has advantages such as a low latency, a high speed, wide coverage, a large capacity, and high reliability. Therefore, implementation of an intelligent transportation system by using the 3GPP cellular technology becomes a current main trend.

The V2X communication may be implemented by sidelink communication. A link for implementing direct communication between terminals is referred to as a sidelink (sidelink, SL). For example, as shown in FIG. 1, a link for implementing direct communication between a vehicle a and a vehicle b is referred to as a sidelink.

The sidelink communication includes a network device scheduling mode. A network device may be a base station or the like. The network device scheduling mode means that a terminal sends request information to the network device, and the network device dynamically or semi-dynamically schedules a resource for V2X sidelink communication. However, it is found in practice that in the network device scheduling mode of the sidelink communication, the resource scheduled by the network device for the terminal cannot meet a quality of service requirement of sidelink data transmission.

SUMMARY

Embodiments of this application provide a communication method and a related device, to provide a quality of service requirement for a network device. Therefore, the network device can schedule, for a terminal, a resource that meets the quality of service requirement of sidelink data transmission.

According to a first aspect, an embodiment of this application provides a communication method. The method is applied to a terminal device, and the method includes: obtaining first data and a quality of service QoS parameter corresponding to the first data, where the QoS parameter includes at least one of reliability information, latency information, communication distance information, data rate information, and service type information; and sending an identifier to a network device, where the identifier corresponds to the QoS parameter. Optionally, the first data is data to be transmitted by the terminal device through a sidelink.

It can be learned that through implementation of the method described in the first aspect, the terminal device may send, to the network device, the identifier corresponding to the QoS parameter. Therefore, after receiving the identifier, the network device may determine the corresponding QoS parameter based on the identifier. Therefore, through implementation of the method described in the first aspect, the terminal device can provide a quality of service requirement for the network device. In addition, the QoS parameter is indicated by using the identifier instead of being directly transmitted, and this helps reduce overheads.

Optionally, the QoS parameter further includes data priority information.

In this implementation, the terminal device can indicate at least two types of QoS parameters to the network device. Therefore, this helps the network device to schedule, for the terminal, resources that meet various quality of service requirements of sidelink data transmission.

Optionally, the identifier may be one of a logical channel group identifier, a quality of service class identifier index (QoS class identifier index, QCI index), and a flow identifier.

Optionally, different types of services may be distinguished by using application identifiers carried at an application layer or upper-layer identifiers delivered by an upper layer (above an access layer).

Optionally, the terminal device further receives a first message sent by the network device, where the first message includes a correspondence between an identifier and a QoS parameter. After receiving the first message sent by the network device, the terminal device may store the correspondence, included in the first message, between an identifier and a QoS parameter. In other words, in this implementation, the correspondence, stored in the terminal device, between an identifier and a QoS parameter is configured by the network device.

Optionally, the first message may be radio resource control (radio resource control, RRC) signaling.

Optionally, the correspondence, stored in the terminal device, between an identifier and a QoS parameter may be preconfigured. For example, the correspondence between an identifier and a QoS parameter is specified in a protocol, and a device vendor may preconfigure the correspondence between an identifier and a QoS parameter into the terminal device before delivery of the terminal device. Alternatively, when the terminal device accesses a network, the network device may preconfigure the correspondence between an identifier and a QoS parameter into the terminal device.

Optionally, the correspondence between an identifier and a QoS parameter is preconfigured for the terminal device; and after the terminal device receives the first message that is sent by the network device and that includes the correspondence between an identifier and a QoS parameter, the terminal device replaces the preconfigured correspondence between an identifier and a QoS parameter with the correspondence, included in the first message, between an identifier and a QoS parameter. In other words, after receiving the first message sent by the network device, the terminal device may update the preconfigured correspondence between an identifier and a QoS parameter with the correspondence, included in the first message, between an identifier and a QoS parameter.

Optionally, a specific implementation of sending the identifier to the network device is: sending a buffer status report BSR to the network device, where the BSR includes the identifier, and the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier. The data corresponding to the identifier is data corresponding to the QoS parameter that corresponds to the identifier.

Optionally, a data volume in the terminal device may include but is not limited to a data volume in a buffer of the terminal device. The buffer may be a packet data convergence protocol (packet data convergence protocol, PDCP) buffer and/or a radio link control (radio link control, RLC) buffer. This is not limited in this application.

Because the BSR is dynamically sent, in this implementation, the terminal device may dynamically send, to the network device, the identifier and the total data volume of all data corresponding to the identifier, or may dynamically send, to the network device, the identifier, the destination address information corresponding to the first data, and/or the data volume of all data that is in the terminal device and that corresponds to both the destination address information and the identifier. Therefore, the network device may dynamically perform a related operation based on the identifier and the total data volume of all data corresponding to the identifier, or based on the destination address information corresponding to the first data and/or the data volume of all data that is in the terminal device and that corresponds to both the destination address information and the identifier.

Optionally, the terminal device further receives scheduling resource information sent by the network device, where a scheduling resource corresponding to the scheduling resource information has a subcarrier spacing and/or a transmission time interval; and the terminal device further transmits, through the sidelink by using the scheduling resource corresponding to the scheduling resource information, the data corresponding to the identifier, where the subcarrier spacing and/or the transmission time interval correspond/corresponds to the identifier.

It can be learned that in this implementation, the network device may allocate the scheduling resource to the terminal device, and the terminal device may transmit the corresponding data by using the allocated scheduling resource.

Optionally, the terminal device further receives a second message sent by the network device, where the second message includes a correspondence between a subcarrier spacing and/or a transmission time interval and an identifier. After receiving the second message sent by the network device, the terminal device may store the correspondence, included in the second message, between a subcarrier spacing and/or a transmission time interval and an identifier. In other words, in this implementation, the correspondence, stored in the terminal device, between a subcarrier spacing and/or a transmission time interval and an identifier is configured by the network device.

Optionally, the second message may be RRC signaling.

Optionally, the correspondence, stored in the terminal device, between a subcarrier spacing and/or a transmission time interval and an identifier may be preconfigured. For example, the correspondence between a subcarrier spacing and/or a transmission time interval and an identifier is specified in a protocol. Alternatively, a device vendor may preconfigure the correspondence between a subcarrier spacing and/or a transmission time interval and an identifier into the terminal device before delivery of the terminal device. Alternatively, when the terminal device accesses a network, the network device may preconfigure the correspondence between a subcarrier spacing and/or a transmission time interval and an identifier into the terminal device.

Optionally, the correspondence between a subcarrier spacing and/or a transmission time interval and an identifier is preconfigured for the terminal device; and after the terminal device receives the second message that is sent by the network device and that includes the correspondence between a subcarrier spacing and/or a transmission time interval and an identifier, the terminal device replaces the preconfigured correspondence between a subcarrier spacing and/or a transmission time interval and an identifier with the correspondence, included in the second message, between a subcarrier spacing and/or a transmission time interval and an identifier. In other words, after receiving the second message sent by the network device, the terminal device may update the preconfigured correspondence between a subcarrier spacing and/or a transmission time interval and an identifier with the correspondence, included in the second message, between a subcarrier spacing and/or a transmission time interval and an identifier.

According to a second aspect, an embodiment of this application provides a communication method. The method is applied to a terminal device, and the method includes: obtaining first data and a QoS parameter corresponding to the first data, where the QoS parameter includes at least one of reliability information, latency information, communication distance information, data rate information, and service type information; determining an identifier, where the identifier corresponds to the QoS parameter; receiving scheduling resource information sent by a network device, where a scheduling resource corresponding to the scheduling resource information has a subcarrier spacing and/or a transmission time interval; and transmitting, through a sidelink by using the scheduling resource corresponding to the scheduling resource information, data corresponding to the identifier, where the identifier corresponds to the subcarrier spacing and/or the transmission time interval.

Through implementation of the method described in the second aspect, the terminal device does not dynamically apply to the network device for the scheduling resource, and the network device can statically or semi-statically configure a resource set for the terminal device. Therefore, the terminal device can independently select the appropriate scheduling resource from the resource set to transmit the corresponding data. The resource set may include but is not limited to a resource pool or a semi-statically scheduled resource.

Optionally, the QoS parameter further includes data priority information.

Optionally, the identifier may be one of a logical channel group identifier, a quality of service class identifier index (QoS class identifier index, QCI index), and a flow identifier.

Optionally, different types of services may be distinguished by using application identifiers carried at an application layer or upper-layer identifiers delivered by an upper layer (above an access layer).

Optionally, the terminal device further receives a first message sent by the network device, where the first message includes a correspondence between an identifier and a QoS parameter.

Optionally, the first message may be radio resource control (radio resource control, RRC) signaling.

Optionally, the correspondence, stored in the terminal device, between an identifier and a QoS parameter may be preconfigured.

Optionally, the correspondence between an identifier and a QoS parameter is preconfigured for the terminal device; and after the terminal device receives the first message that is sent by the network device and that includes the correspondence between an identifier and a QoS parameter, the terminal device replaces the preconfigured correspondence between an identifier and a QoS parameter with the correspondence, included in the first message, between an identifier and a QoS parameter.

Optionally, the terminal device further receives a second message sent by the network device, where the second message includes a correspondence between a subcarrier spacing and/or a transmission time interval and an identifier.

Optionally, the second message may be RRC signaling.

Optionally, the correspondence, stored in the terminal device, between a subcarrier spacing and/or a transmission time interval and an identifier may be preconfigured.

Optionally, the correspondence between a subcarrier spacing and/or a transmission time interval and an identifier is preconfigured for the terminal device; and after the terminal device receives the second message that is sent by the network device and that includes the correspondence between a subcarrier spacing and/or a transmission time interval and an identifier, the terminal device replaces the preconfigured correspondence between a subcarrier spacing and/or a transmission time interval and an identifier with the correspondence, included in the second message, between a subcarrier spacing and/or a transmission time interval and an identifier.

For beneficial effects of optional implementations of the second aspect, refer to beneficial effects of corresponding parts of the first aspect. Details are not described herein again.

According to a third aspect, an embodiment of this application provides a communication method. The method is applied to a terminal device, and the method includes: obtaining first data and a quality of service QoS parameter corresponding to the first data, where the QoS parameter includes at least one of reliability information, latency information, communication distance information, data rate information, and service type information; and sending an SR to a network device by using an SR resource. Optionally, the SR resource corresponds to an identifier, and the identifier corresponds to the QoS parameter. Optionally, the SR resource corresponds to the QoS parameter.

It can be learned that through implementation of the method described in the third aspect, the terminal device may determine, based on the QoS parameter, the SR resource for sending the SR, and send the SR on the determined scheduling request (scheduling request, SR) resource. Therefore, after detecting the SR on the SR resource, the network device may determine the QoS parameter based on the SR resource. Therefore, through implementation of the method described in the third aspect, the terminal device can provide a quality of service requirement for the network device. In addition, the QoS parameter is indicated by using the SR resource instead of being directly transmitted, and this helps reduce overheads.

Optionally, the QoS parameter further includes data priority information.

In this implementation, the terminal device can indicate at least two types of QoS parameters to the network device. Therefore, this helps the network device to schedule, for the terminal, resources that meet various quality of service requirements of sidelink data transmission.

Optionally, the identifier may be one of a logical channel group identifier, a QCI index, and a flow identifier.

Optionally, different types of services may be distinguished by using application identifiers carried at an application layer or upper-layer identifiers delivered by an upper layer (above an access layer).

Optionally, the terminal device further receives a first message sent by the network device, where the first message includes a correspondence between an identifier and a QoS parameter and a correspondence between an SR resource and an identifier.

Optionally, the first message may be RRC signaling.

Optionally, the correspondence, stored in the terminal device, between an identifier and a QoS parameter and the correspondence, stored in the terminal device, between an SR resource and an identifier may be preconfigured.

Optionally, the correspondence between an identifier and a QoS parameter and the correspondence between an SR resource and an identifier are preconfigured for the terminal device; and after the terminal device receives the first message that is sent by the network device and that includes the correspondence between an identifier and a QoS parameter and the correspondence between an SR resource and an identifier, the terminal device replaces the preconfigured correspondence between an identifier and a QoS parameter and the preconfigured correspondence between an SR resource and an identifier with the correspondence, included in the first message, between an identifier and a QoS parameter and the correspondence, included in the first message, between an SR resource and an identifier.

Optionally, the terminal device may receive a first message sent by the network device, where the first message includes a correspondence between an SR resource and a QoS parameter.

Optionally, the correspondence, stored in the terminal device, between an SR resource and a QoS parameter may be preconfigured.

Optionally, the correspondence between an SR resource and a QoS parameter is preconfigured for the terminal device; and after the terminal device receives the first message that is sent by the network device and that includes the correspondence between an SR resource and a QoS parameter, the terminal device replaces the preconfigured correspondence between an SR resource and a QoS parameter with the correspondence, included in the first message, between an SR resource and a QoS parameter.

Optionally, the terminal device further receives scheduling resource information sent by the network device, where a scheduling resource corresponding to the scheduling resource information has a subcarrier spacing and/or a transmission time interval; and transmits, through a sidelink by using the scheduling resource corresponding to the scheduling resource information, data corresponding to the identifier, where the subcarrier spacing and/or the transmission time interval correspond/corresponds to the identifier.

It can be learned that in this implementation, the network device may allocate the scheduling resource to the terminal device, and the terminal device may transmit the corresponding data by using the allocated scheduling resource.

Optionally, the terminal device further receives a second message sent by the network device, where the second message includes a correspondence between a subcarrier spacing and/or a transmission time interval and an identifier.

Optionally, the second message may be RRC signaling.

Optionally, the correspondence, stored in the terminal device, between a subcarrier spacing and/or a transmission time interval and an identifier may be preconfigured.

Optionally, the correspondence between a subcarrier spacing and/or a transmission time interval and an identifier is preconfigured for the terminal device; and after the terminal device receives the second message that is sent by the network device and that includes the correspondence between a subcarrier spacing and/or a transmission time interval and an identifier, the terminal device replaces the preconfigured correspondence between a subcarrier spacing and/or a transmission time interval and an identifier with the correspondence, included in the second message, between a subcarrier spacing and/or a transmission time interval and an identifier.

Optionally, the SR resource is an SR resource that is in a plurality of SR resources corresponding to the identifier and that corresponds to a data volume of the first data.

In this implementation, the terminal device can provide the data volume of the first data for the network device.

Optionally, the data volume of the first data may include but is not limited to a data volume of a buffer corresponding to the first data.

Optionally, the SR resource used by the terminal device to send the SR is an SR resource that is in a plurality of SR resources corresponding to the QoS parameter and that corresponds to a data volume of the first data. In this implementation, the terminal device can provide the data volume of the first data for the network device.

Optionally, the terminal device may receive a third message sent by the network device, where the third message includes a correspondence between a data volume and an SR resource.

Optionally, the third message may be RRC signaling.

Optionally, the correspondence, stored in the terminal device, between a data volume and an SR resource may be preconfigured.

Optionally, the correspondence between a data volume and an SR resource is preconfigured for the terminal device; and after the terminal device receives the third message that is sent by the network device and that includes the correspondence between a data volume and an SR resource, the terminal device replaces the preconfigured correspondence between a data volume and an SR resource with the correspondence, included in the third message, between a data volume and an SR resource.

Optionally, the terminal device may receive a fourth message sent by the network device, where the fourth message includes a correspondence between a data volume and a pilot sequence.

Optionally, the correspondence, stored in the terminal device, between a data volume and a pilot sequence may be preconfigured.

Optionally, the correspondence between a data volume and a pilot sequence is preconfigured for the terminal device; and after receiving the fourth message that is sent by the network device and that includes the correspondence between a data volume and a pilot sequence, the terminal device replaces the preconfigured correspondence between a data volume and a pilot sequence with the correspondence, included in the fourth message, between a data volume and a pilot sequence.

In this case, the terminal device may send different pilot sequences on a same SR resource to distinguish between data volumes. Therefore, the network device may determine a data volume by detecting a corresponding SR resource and detecting a pilot sequence.

According to a fourth aspect, an embodiment of this application provides a communication method. The method is applied to a network device, and the method includes: receiving an identifier from a terminal device; and determining a QoS parameter, where the QoS parameter corresponds to the identifier, and the QoS parameter includes at least one of reliability information, latency information, communication distance information, data rate information, and service type information.

Optionally, the QoS parameter further includes data priority information.

Optionally, the identifier may be one of a logical channel group identifier, a QCI index, and a flow identifier.

Optionally, different types of services may be distinguished by using application identifiers carried at an application layer or upper-layer identifiers delivered by an upper layer (above an access layer).

Optionally, the network device further sends a first message to the terminal device, where the first message includes a correspondence between an identifier and a QoS parameter.

Optionally, the first message may be RRC signaling.

Optionally, a specific implementation of receiving, by the network device, the identifier from the terminal device is: receiving a buffer status report BSR from the terminal device, where the BSR includes the identifier, and the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier. The data corresponding to the identifier is data corresponding to the QoS parameter that corresponds to the identifier.

Optionally, a data volume in the terminal device may include but is not limited to a data volume in a buffer of the terminal device. The buffer may be a packet data convergence protocol (packet data convergence protocol, PDCP) buffer and/or a radio link control (radio link control, RLC) buffer. This is not limited in this application.

Optionally, the network device further sends scheduling resource information to the terminal device, where a scheduling resource corresponding to the scheduling resource information has a subcarrier spacing and/or a transmission time interval.

Optionally, the network device further sends a second message to the terminal device, where the second message includes a correspondence between a subcarrier spacing and/or a transmission time interval and an identifier.

For beneficial effects of the fourth aspect, refer to beneficial effects of corresponding parts of the first aspect. Details are not described herein again.

According to a fifth aspect, an embodiment of this application provides a communication method. The method is applied to a network device, and the method includes: detecting an SR on an SR resource; and determining a QoS parameter, where the QoS parameter includes at least one of reliability information, latency information, communication distance information, data rate information, and service type information. Optionally, the QoS parameter corresponds to an identifier, and the identifier corresponds to the SR resource. Optionally, the QoS parameter corresponds to the SR resource.

Optionally, the QoS parameter further includes data priority information.

Optionally, the identifier may be one of a logical channel group identifier, a QCI index, and a flow identifier.

Optionally, different types of services may be distinguished by using application identifiers carried at an application layer or upper-layer identifiers delivered by an upper layer (above an access layer).

Optionally, the network device further sends a first message to a terminal device, where the first message includes a correspondence between an identifier and a QoS parameter and a correspondence between an SR resource and an identifier.

Optionally, the first message may be RRC signaling.

Optionally, the network device may send a first message to the terminal device, where the first message includes a correspondence between an SR resource and a QoS parameter.

Optionally, the network device further sends scheduling resource information to the terminal device, where a scheduling resource corresponding to the scheduling resource information has a subcarrier spacing and/or a transmission time interval.

Optionally, the network device further sends a second message to the terminal device, where the second message includes a correspondence between a subcarrier spacing and/or a transmission time interval and an identifier.

Optionally, the second message may be RRC signaling.

Optionally, the network device further determines a data volume, where the data volume corresponds to the SR resource.

Optionally, the network device sends a third message to the terminal device, where the third message includes a correspondence between a data volume and an SR resource.

Optionally, the network device further detects a pilot sequence on the SR resource and determines a data volume, where the data volume corresponds to the detected pilot sequence.

Optionally, the network device sends a fourth message to the terminal device, where the fourth message includes a correspondence between a data volume and a pilot sequence.

For beneficial effects of the fifth aspect, refer to beneficial effects of corresponding parts of the third aspect. Details are not described herein again.

According to a sixth aspect, a terminal device is provided. The terminal device includes: a processing module, configured to obtain first data and a quality of service QoS parameter corresponding to the first data, where the QoS parameter includes at least one of reliability information, latency information, communication distance information, data rate information, and service type information; and a communications module, configured to send an identifier to a network device, where the identifier corresponds to the QoS parameter. Optionally, the first data is data to be transmitted by the terminal device through a sidelink.

Optionally, the QoS parameter further includes data priority information.

Optionally, the communications module is further configured to receive a first message sent by the network device, where the first message includes a correspondence between an identifier and a QoS parameter.

Optionally, a manner of sending, by the communications module, the identifier to the network device is specifically: sending a buffer status report BSR to the network device, where the BSR includes the identifier, and the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier.

Optionally, the communications module is further configured to receive scheduling resource information sent by the network device, where a scheduling resource corresponding to the scheduling resource information has a subcarrier spacing and/or a transmission time interval; and the communications module is further configured to transmit, through the sidelink by using the scheduling resource corresponding to the scheduling resource information, the data corresponding to the identifier, where the subcarrier spacing and/or the transmission time interval correspond/corresponds to the identifier.

Optionally, the communications module is further configured to receive a second message sent by the network device, where the second message includes a correspondence between a subcarrier spacing and/or a transmission time interval and an identifier.

Optionally, the network device may further perform another possible implementation of the first aspect. Details are not described herein again. Based on a same inventive concept, for a problem-resolving principle and beneficial effects of the terminal device, refer to the problem-resolving principle and the beneficial effects of the first aspect or the possible implementations of the first aspect. Repeated parts are not described in detail again.

According to a seventh aspect, a terminal device is provided. The terminal device includes: a processing module, configured to obtain first data and a QoS parameter corresponding to the first data, where the QoS parameter includes at least one of reliability information, latency information, communication distance information, data rate information, and service type information, where the processing module is further configured to determine an identifier, where the identifier corresponds to the QoS parameter; and a communications module, configured to receive scheduling resource information sent by a network device, where a scheduling resource corresponding to the scheduling resource information has a subcarrier spacing and/or a transmission time interval, where the communications module is further configured to transmit, through a sidelink by using the scheduling resource corresponding to the scheduling resource information, data corresponding to the identifier, where the identifier corresponds to the subcarrier spacing and/or the transmission time interval.

Optionally, the QoS parameter further includes data priority information.

Optionally, the communications module further receives a first message sent by the network device, where the first message includes a correspondence between an identifier and a QoS parameter.

Optionally, the communications module further receives a second message sent by the network device, where the second message includes a correspondence between a subcarrier spacing and/or a transmission time interval and an identifier.

Optionally, the correspondence, stored in the terminal device, between a subcarrier spacing and/or a transmission time interval and an identifier may be preconfigured.

Optionally, the terminal device may further perform another possible implementation of the second aspect.

Details are not described herein again. Based on a same inventive concept, for a problem-resolving principle and beneficial effects of the terminal device, refer to the problem-resolving principle and the beneficial effects of the second aspect or the possible implementations of the second aspect. Repeated parts are not described in detail again.

According to an eighth aspect, a terminal device is provided. The terminal device includes: a processing module, configured to obtain first data and a quality of service QoS parameter corresponding to the first data, where the QoS parameter includes at least one of reliability information, latency information, communication distance information, data rate information, and service type information; and a communications module, configured to send an SR to a network device by using an SR resource. Optionally, the SR resource corresponds to an identifier, and the identifier corresponds to the QoS parameter. Optionally, the SR resource corresponds to the QoS parameter.

Optionally, the QoS parameter further includes data priority information.

Optionally, the communications module is further configured to receive a first message sent by the network device, where the first message includes a correspondence between an identifier and a QoS parameter and a correspondence between an SR resource and an identifier.

Optionally, the terminal device may receive a first message sent by the network device, where the first message includes a correspondence between an SR resource and a QoS parameter.

Optionally, the communications module is further configured to receive scheduling resource information sent by the network device, where a scheduling resource corresponding to the scheduling resource information has a subcarrier spacing and/or a transmission time interval; and the communications module is further configured to transmit, through a sidelink by using the scheduling resource corresponding to the scheduling resource information, data corresponding to the identifier, where the subcarrier spacing and/or the transmission time interval correspond/corresponds to the identifier.

Optionally, the communications module is further configured to receive a second message sent by the network device, where the second message includes a correspondence between a subcarrier spacing and/or a transmission time interval and an identifier.

Optionally, the SR resource used by the communications module to send the SR is an SR resource that is in a plurality of SR resources corresponding to the identifier and that corresponds to a data volume of the first data.

Optionally, the SR resource used by the communications module to send the SR is an SR resource that is in a plurality of SR resources corresponding to the QoS parameter and that corresponds to a data volume of the first data.

Optionally, the communications module is further configured to receive a third message sent by the network device, where the third message includes a correspondence between a data volume and an SR resource.

Optionally, the communications module is further configured to receive a fourth message sent by the network device, where the fourth message includes a correspondence between a data volume and a pilot sequence. In this case, the communications module may send different pilot sequences on a same SR resource to distinguish between data volumes. Therefore, the network device may determine a data volume by detecting a corresponding SR resource and detecting a pilot sequence.

Optionally, the terminal device may further perform another possible implementation of the third aspect. Details are not described herein again. Based on a same inventive concept, for a problem-resolving principle and beneficial effects of the terminal device, refer to the problem-resolving principle and the beneficial effects of the third aspect or the possible implementations of the third aspect. Repeated parts are not described in detail again.

According to a ninth aspect, a network device is provided. The network device includes: a communications module, configured to receive an identifier from a terminal device; and a processing module, configured to determine a QoS parameter, where the QoS parameter corresponds to the identifier, and the QoS parameter includes at least one of reliability information, latency information, communication distance information, data rate information, and service type information.

Optionally, the QoS parameter further includes data priority information.

Optionally, the communications module is further configured to send a first message to the terminal device, where the first message includes a correspondence between an identifier and a QoS parameter.

Optionally, a manner of receiving, by the communications module, the identifier from the terminal device is specifically: receiving a buffer status report BSR from the terminal device, where the BSR includes the identifier, and the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier.

Optionally, the communications module is further configured to send scheduling resource information to the terminal device, where a scheduling resource corresponding to the scheduling resource information has a subcarrier spacing and/or a transmission time interval.

Optionally, the communications module is further configured to send a second message to the terminal device, where the second message includes a correspondence between a subcarrier spacing and/or a transmission time interval and an identifier.

Optionally, the terminal device may further perform another possible implementation of the fourth aspect. Details are not described herein again. Based on a same inventive concept, for a problem-resolving principle and beneficial effects of the terminal device, refer to the problem-resolving principle and the beneficial effects of the fourth aspect or the possible implementations of the fourth aspect. Repeated parts are not described in detail again.

According to a tenth aspect, a network device is provided. The network device includes: a communications module, configured to detect an SR on an SR resource; and a processing module, configured to determine a QoS parameter, where the QoS parameter includes at least one of reliability information, latency information, communication distance information, data rate information, and service type information. Optionally, the QoS parameter corresponds to an identifier, and the identifier corresponds to the SR resource. Optionally, the QoS parameter corresponds to the SR resource.

Optionally, the QoS parameter further includes data priority information.

Optionally, the communications module is further configured to send a first message to a terminal device, where the first message includes a correspondence between an identifier and a QoS parameter and a correspondence between an SR resource and an identifier.

Optionally, the communications module is further configured to send a first message to the terminal device, where the first message includes a correspondence between an SR resource and a QoS parameter.

Optionally, the communications module is further configured to send scheduling resource information to the terminal device, where a scheduling resource corresponding to the scheduling resource information has a subcarrier spacing and/or a transmission time interval.

Optionally, the communications module is further configured to send a second message to the terminal device, where the second message includes a correspondence between a subcarrier spacing and/or a transmission time interval and an identifier.

Optionally, the processing module is further configured to determine a data volume, where the data volume corresponds to the SR resource.

Optionally, the communications module is further configured to send a third message to the terminal device, where the third message includes a correspondence between a data volume and an SR resource.

Optionally, the processing module is further configured to detect a pilot sequence on the SR resource and determine a data volume, where the data volume corresponds to the detected pilot sequence.

Optionally, the communications module is further configured to send a fourth message to the terminal device, where the fourth message includes a correspondence between a data volume and a pilot sequence.

Optionally, the terminal device may further perform another possible implementation of the fifth aspect. Details are not described herein again. Based on a same inventive concept, for a problem-resolving principle and beneficial effects of the terminal device, refer to the problem-resolving principle and the beneficial effects of the fifth aspect or the possible implementations of the fifth aspect. Repeated parts are not described in detail again.

According to an eleventh aspect, a communications device is provided. The communications device includes: at least one processor and a communications interface. The communications interface is used by the communications device to exchange information with another communications device; and when a program instruction is executed in the at least one processor, the method according to any one of the first aspect to the fifth aspect and the optional implementations of the first aspect to the fifth aspect is implemented on either of the following devices: a terminal device and a network device. For problem-resolving implementations and beneficial effects of the communications device, refer to the corresponding descriptions and the beneficial effects of the first aspect to the fifth aspect and the optional implementations of the first aspect to the fifth aspect. Repeated parts are not described in detail again.

According to a twelfth aspect, a computer program storage medium is provided. The computer program storage medium has a program instruction; and when the program instruction is directly or indirectly executed, the method according to any one of the first aspect to the fifth aspect and the optional implementations of the first aspect to the fifth aspect is implemented on either of the following devices: a terminal device and a network device.

According to a thirteenth aspect, a chip system is provided. The chip system is applied to a communications device and includes at least one processor; and when a program instruction is executed in the at least one processor, the method according to any one of the first aspect to the fifth aspect and the optional implementations of the first aspect to the fifth aspect is implemented on either of the following devices: a terminal device and a network device.

According to a fourteenth aspect, a communications system is provided. The communications system includes the foregoing communications device. For example, the communications system includes a terminal device and a network device. The terminal device performs the method described in the first aspect and the optional implementations of the first aspect, and the network device performs the method described in the fourth aspect and the optional implementations of the fourth aspect. Alternatively, the terminal device performs the method described in the third aspect and the optional implementations of the third aspect, and the network device performs the method described in the fifth aspect and the optional implementations of the fifth aspect.

DESCRIPTION OF EMBODIMENTS

The following further describes specific embodiments of this application in detail with reference to the accompanying drawings.

Embodiments of this application provide a communication method and a related device, to provide a quality of service requirement for a network device. Therefore, the network device can schedule, for a terminal, a resource that meets the quality of service requirement of sidelink data transmission.

To better understand the embodiments of this application, the following describes a communications system to which the embodiments of this application may be applied.

Figure 1:
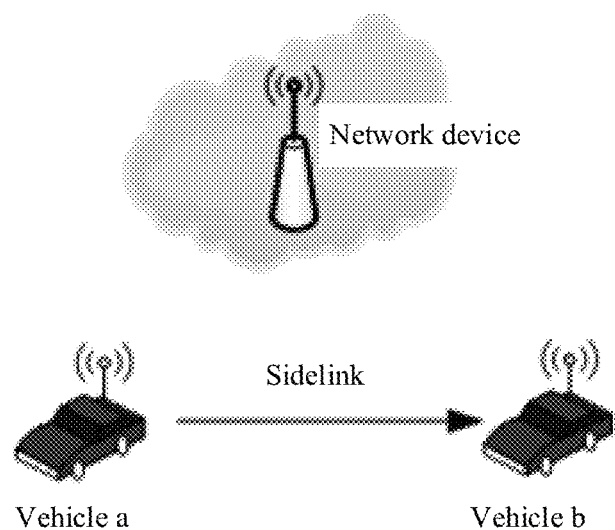
FIG. 1 is a schematic diagram of an existing communications system.
Figure 2:
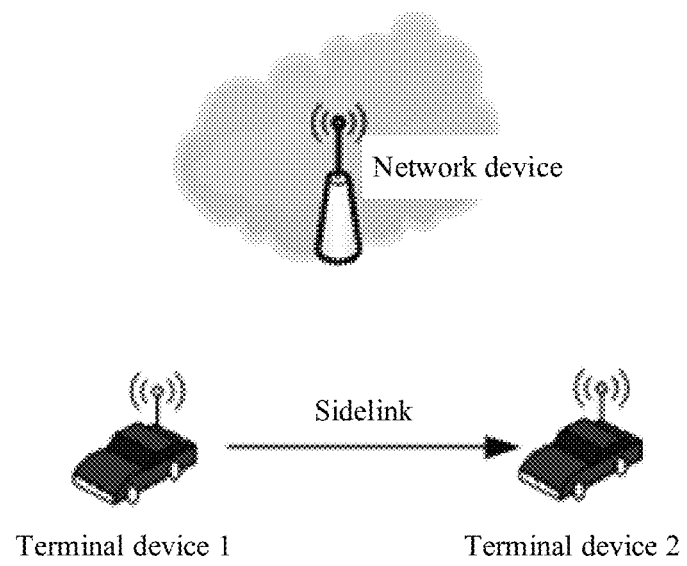
FIG. 2 is a schematic diagram of a communications system according to an embodiment of this application.

FIG. 2 is a schematic diagram of a communications system according to an embodiment of this application. As shown in FIG. 2, the communications system includes a network device and at least one terminal device. In FIG. 2, an example in which the communications system includes a terminal device 1 and a terminal device 2 is used.

The network device may be an evolved NodeB (evolved NodeB, eNB or eNodeB) in an LTE system, or a radio network controller in a cloud radio access network (cloud radio access network, CRAN), or may be an access network device in a 5G network, for example, a gNB, or may be a small cell, a micro base station, or a transmission reception point (transmission reception point, TRP), or may be a relay station, an access point, an access network device in a future evolved public land mobile network (public land mobile network, PLMN), or the like.

The terminal device may be an access terminal, user equipment (user equipment, UE), a subscriber unit, a subscriber station, a mobile station, a mobile console, a remote station, a remote terminal, a mobile device, a user terminal, a terminal, a wireless communications device, a user agent, a user apparatus, a vehicle, or an infrastructure. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device that has a wireless communication function, a computing device, another processing device connected to a wireless modem, a vehicle-mounted device, a wearable device, a terminal device in the internet of things, a virtual reality device, a terminal device in a future 5G network, a terminal device in a future evolved public land mobile network (public land mobile network, PLMN), or the like. In FIG. 2, an example in which the terminal device 1 and the terminal device 2 are vehicles is used.

The terminal device 1 sends data to the terminal device 2 through sidelink communication. The sidelink communication means that the terminal device 1 directly sends the data to the terminal device 2, and the data sent by the terminal device 1 to the terminal device 2 is not forwarded by the network device. As shown in FIG. 2, a link for implementing direct communication between the terminal device 1 and the terminal device 2 is referred to as a sidelink.

The sidelink communication includes a network device scheduling mode. The network device scheduling mode means that a terminal device sends request information to a network device, and the network device dynamically or semi-dynamically schedules a resource for V2X sidelink communication. For example, if the terminal device 1 needs to send data to the terminal device 2 through the sidelink, the terminal device 1 needs to send request information to the network device. Therefore, the network device allocates, to the terminal device 1, a scheduling resource used to send the data to the terminal device 2 through the sidelink.

The following describes in detail the communication method and the related device that are provided in this application.

Figure 3:
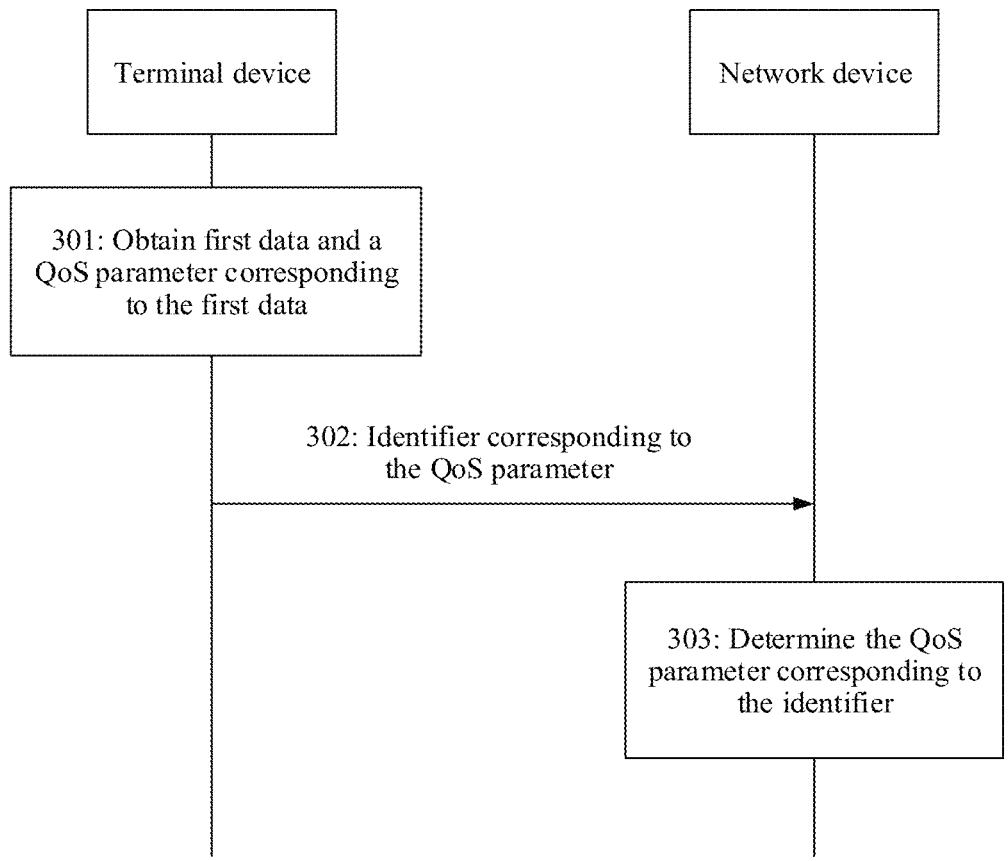
FIG. 3 is a schematic flowchart of a communication method according to an embodiment of this application.

FIG. 3 is a schematic flowchart of a communication method according to an embodiment of this application. As shown in FIG. 3, the communication method includes the following parts 301 to 303.

301: A terminal device obtains first data and a QoS parameter corresponding to the first data.

In this embodiment of this application, for example, the terminal device may be the terminal device 1 or the terminal device 2 shown in FIG. 2.

In this embodiment of this application, the quality of service (quality of service, QoS) parameter includes at least one of reliability information, latency information, communication distance information, data rate information, and service type information.

For example, the QoS parameter includes one of the reliability information, the latency information, the communication distance information, the data rate information, and the service type information.

Alternatively, the QoS parameter includes any two of the reliability information, the latency information, the communication distance information, the data rate information, and the service type information. For example, the QoS parameter includes the reliability information and the latency information; or the QoS parameter includes the reliability information and the communication distance information; or the QoS parameter includes the reliability information and the data rate information; or the QoS parameter includes the latency information and the communication distance information; or the QoS parameter includes the latency information and the data rate information; or the QoS parameter includes the communication distance information and the data rate information.

Alternatively, the QoS parameter includes any three of the reliability information, the latency information, the communication distance information, the data rate information, and the service type information. For example, the QoS parameter includes the reliability information, the latency information, and the communication distance information; or the QoS parameter includes the latency information, the communication distance information, and the data rate information; or the QoS parameter includes the communication distance information, the data rate information, and the service type information.

Alternatively, the QoS parameter includes any four of the reliability information, the latency information, the communication distance information, the data rate information, and the service type information. For example, the QoS parameter includes the reliability information, the latency information, the communication distance information, and the data rate information; or the QoS parameter includes the latency information, the communication distance information, the data rate information, and the service type information.

Alternatively, the QoS parameter includes the reliability information, the latency information, the communication distance information, the data rate information, and the service type information.

Optionally, the QoS parameter further includes data priority information. In this implementation, the terminal device can indicate at least two types of QoS parameters to a network device. Therefore, this helps the network device to schedule, for the terminal, resources that meet various quality of service requirements of sidelink data transmission.

The reliability information is used to indicate reliability corresponding to the data. Data on the terminal device may have different reliability. The reliability corresponding to the data represents a transmission reliability requirement/level/constraint of the data. The transmission reliability may be but is not limited to end-to-end transmission reliability, air interface transmission reliability, or the like. For example, the transmission reliability may be defined as a 1-bit error ratio, namely, a 1-bit error rate; a 1-symbol error ratio, namely, a 1-symbol error rate; or a 1-packet error ratio, namely, a 1-packet error rate.

The latency information is used to indicate a latency corresponding to the data. The data on the terminal device may have different latency requirements/constraints. The latency may be but is not limited to an end-to-end transmission latency, an air interface latency, a latency budget, a transmission time interval, or the like.

The communication distance information is used to indicate a communication distance corresponding to the data. The data on the terminal device may have different communication distances.

The transmission rate information is used to indicate a transmission rate corresponding to the data. The data on the terminal device may have different transmission rates.

The terminal device may support a plurality of different types of services, and different pieces of service type information are used to indicate the different types of services. For example, the foregoing different types of services may be services corresponding to different receive ends and/or different transmit ends. For example, the foregoing different types of services may be a V2V service, a V2P service, a V2I service, a V2N service, a pedestrian to vehicle (pedestrian to vehicle, P2V) service, a pedestrian to pedestrian (pedestrian to pedestrian, P2P) service, and a pedestrian to infrastructure (pedestrian to infrastructure, P2I) service.

Optionally, the foregoing different types of services may be distinguished by using application identifiers carried at an application layer or upper-layer identifiers delivered by an upper layer (above an access layer). For example, a collision warning service and an entertainment and multimedia service may have different upper-layer identifiers. For example, the upper-layer identifier may be an intelligent transportation system application identifier (ITS application identifier, ITS-AID) or a service provider identifier (provider service identifier, PSID).

The data priority information is used to indicate a priority corresponding to the data. The data on the terminal device may have different priorities. Usually, data with different priorities is different in resource selection and allocation at the access layer, and transmission of high-priority data should be preferentially ensured.

The QoS parameter may include but is not limited to an identifier, an index, or other information pointing to or indicating QoS. For example, the QoS parameter is the reliability information, and the reliability information may be but is not limited to a reliability identifier, a reliability index, a reliability range, and a reliability value.

Optionally, a specific implementation in which the terminal device obtains the first data and the quality of service QoS parameter corresponding to the first data is: The access layer of the terminal device receives the first data and the quality of service QoS parameter corresponding to the first data that are sent by the upper layer (which is a layer above the access layer, and for example, may be an application layer, a network transmission layer, or an adaptation layer) of the terminal device. In this implementation, after generating the first data and the quality of service QoS parameter corresponding to the first data, the upper layer of the terminal device sends, to the access layer of the terminal device, the first data and the quality of service QoS parameter corresponding to the first data.

302: The terminal device sends an identifier to the network device.

The identifier corresponds to the QoS parameter.

In this embodiment of this application, the terminal device stores a correspondence between an identifier and a QoS parameter. After obtaining the QoS parameter, the terminal device obtains, based on the correspondence between an identifier and a QoS parameter, the identifier corresponding to the QoS parameter, and sends the identifier corresponding to the QoS parameter to the network device.

For example, the terminal device stores a correspondence shown in the following Table 1. If the QoS parameter is reliability information 1, latency information 1, communication distance information 1, data rate information 1, and data priority information 1, after obtaining the QoS parameter, the terminal device finds, from the correspondence shown in Table 1, an identifier 1 corresponding to the QoS parameter, and sends the identifier 1 to the network device.

TABLE 1

| Identifier | QoS parameter |
| --- | --- |
| Identifier 1 | Reliability information 1, latency information 1, communication distance information 1, data rate information 1, and data priority information 1 |
| Identifier 2 | Reliability information 2, latency information 2, communication distance information 2, data rate information 2, and data priority information 2 |
| Identifier 3 | Reliability information 3, latency information 3, communication distance information 3, data rate information 3, and data priority information 3 |

For another example, the terminal device stores a correspondence shown in the following Table 2. Different QoS parameters may correspond to a same identifier. For example, a QoS parameter, namely, reliability information 1, latency information 1, communication distance information 1, data rate information 1, and data priority information 1, corresponds to an identifier 1; and a QoS parameter, namely, reliability information 2, latency information 1, communication distance information 1, data rate information 1, and data priority information 1, also corresponds to the identifier 1.

TABLE 2

| Identifier | QoS parameter |
| --- | --- |
| Identifier 1 | Reliability information 1, latency information 1, communication distance information 1, data rate information 1, and data priority information 1 Reliability information 2, latency information 1, communication distance information 1, data rate information 1, and data priority information 1 |
| Identifier 2 | Reliability information 2, latency information 2, communication distance information 2, data rate information 2, and data priority information 2 |
| Identifier 3 | Reliability information 3, latency information 3, communication distance information 3, data rate information 3, and data priority information 3 |

Optionally, the identifier may be one of a logical channel group identifier, a QCI index, and a flow identifier.

Optionally, the network device may send a first message to the terminal device, where the first message includes the correspondence between an identifier and a QoS parameter. The terminal device may receive the first message sent by the network device. After receiving the first message sent by the network device, the terminal device stores the correspondence, included in the first message, between an identifier and a QoS parameter. In other words, in this implementation, the correspondence, stored in the terminal device, between an identifier and a QoS parameter is configured by the network device.

Optionally, the first message may be RRC signaling. The RRC signaling may be a system information block (system information block, SIB) or dedicated RRC (dedicated RRC) signaling.

Optionally, the correspondence, in the first message, between an identifier and a QoS parameter may be implicit or explicit.

For example, the correspondence, in the first message, between an identifier and a QoS parameter is implicit. The identifier may have a specific sequence, and the sequence may be stipulated in a protocol. In this case, the first message may not include the identifier. For example, it is assumed that the identifier is a logical channel group identifier and the QoS parameter includes the latency information and the data priority information. The first message includes {latency information 1, data priority information 1}, {latency information 2, data priority information 2}, and {latency information 3, data priority information 3}. It is stipulated in the protocol that logical channel group identifiers are in ascending order, so that a logical channel group identifier 1 to a logical channel group identifier 3 respectively and sequentially correspond to the foregoing items.

For another example, for one piece of information in the QoS parameter such as the data priority information, there may be a specific number or sequence. For example, the priority information may be a priority identifier, and priority identifiers 1 to 8 respectively identify priorities in descending order. When a plurality of QoS parameters correspond to a same identifier, for example, when an identifier 1 corresponds to a priority identifier 1, a priority identifier 2, a priority identifier 3, and a priority identifier 4, that is, the identifier 1 corresponds to the priority identifier 1 to the priority identifier 4, the first message may include only the priority identifier 1 and the priority identifier 4. It is stipulated in the protocol that the priority identifier 1 and the priority identifier 4 that are included in the first message are respectively an upper bound and a lower bound of priority identifiers. In this case, the correspondence may be understood as being implicit. It may be understood that the first message includes a correspondence between the identifier 1 and the priority identifiers 1 to 4. For example, if the QoS parameter corresponding to the first data is the priority identifier 3, it is determined that the priority identifier 3 corresponds to the identifier 1.

For another example, the correspondence, in the first message, between an identifier and a QoS parameter is explicit; and it is assumed that the identifier is a logical channel group identifier and the QoS parameter includes the latency information and the data priority information. The first message includes {latency information 1, data priority information 1, logical channel group identifier 1}, {latency information 2, data priority information 2, logical channel group identifier 2}, and {latency information 3, data priority information 3, logical channel group identifier 3}. In the {latency information 1, data priority information 1, logical channel group identifier 1}, the logical channel group identifier 1 corresponds to the latency information 1 and the data priority information 1. In the {latency information 2, data priority information 2, logical channel group identifier 2}, the logical channel group identifier 2 corresponds to the latency information 2 and the data priority information 2. In the {latency information 3, data priority information 3, logical channel group identifier 3}, the logical channel group identifier 3 corresponds to the latency information 3 and the data priority information 3.

Optionally, the correspondence, stored in the terminal device, between an identifier and a QoS parameter may be preconfigured. For example, the correspondence between an identifier and a QoS parameter is specified in a protocol. Alternatively, a device vendor may preconfigure the correspondence between an identifier and a QoS parameter into the terminal device before delivery of the terminal device. Alternatively, when the terminal device accesses a network, the network device may preconfigure the correspondence between an identifier and a QoS parameter into the terminal device.

Optionally, the correspondence between an identifier and a QoS parameter is preconfigured for the terminal device; and after the terminal device receives the first message that is sent by the network device and that includes the correspondence between an identifier and a QoS parameter, the terminal device replaces the preconfigured correspondence between an identifier and a QoS parameter with the correspondence, included in the first message, between an identifier and a QoS parameter. In other words, after receiving the first message sent by the network device, the terminal device updates the preconfigured correspondence between an identifier and a QoS parameter with the correspondence, included in the first message, between an identifier and a QoS parameter.

Optionally, a specific implementation in which the terminal device sends the identifier to the network device is: The terminal device sends a buffer status report (buffer status report, BSR) to the network device, where the BSR includes the identifier. Optionally, the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier. Correspondingly, a specific implementation in which the network device receives the identifier from the terminal device is: The network device receives the BSR from the terminal device. Optionally, a data volume in the terminal device may include but is not limited to a data volume in a buffer of the terminal device. The buffer may be a packet data convergence protocol (packet data convergence protocol, PDCP) buffer and/or a radio link control (radio link control, RLC) buffer. This is not limited in this application.

The data corresponding to the identifier is data corresponding to the QoS parameter that corresponds to the identifier. When a single identifier corresponds to a plurality of QoS parameters, the data corresponding to the identifier is data corresponding to the plurality of QoS parameters that correspond to the identifier. For example, both the first data and second data correspond to a QoS parameter 1, and the QoS parameter 1 corresponds to an identifier 1. In this case, the identifier 1 corresponds to the first data and the second data. Therefore, all data corresponding to the identifier 1 is the first data and the second data.

The destination address information corresponding to the first data is used to indicate or point to a destination address to which the first data is to be sent. The destination address information may be but is not limited to a destination address identifier, a destination address index, or the like.

Figure 4:
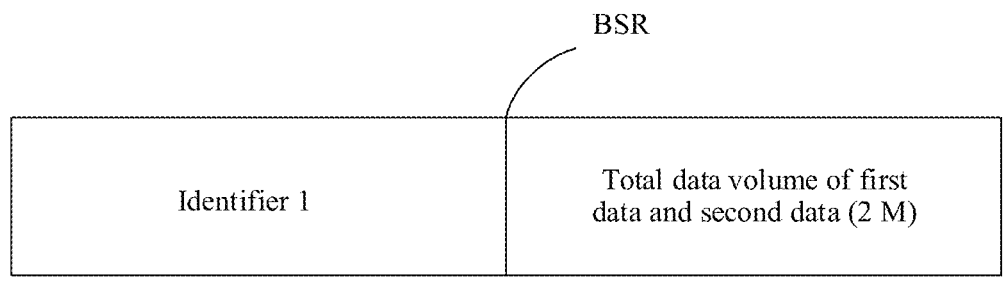
FIG. 4 is a schematic structural diagram of a BSR according to an embodiment of this application.

For example, the BSR includes the identifier and the total data volume of all data that is in the terminal device and that corresponds to the identifier. As shown in FIG. 4, if the terminal device has first data and second data, both the first data and the second data correspond to an identifier 1, and a total data volume of the first data and the second data is 2 M, the BSR includes the identifier 1 and information used to indicate the total data volume of 2 M. It should be noted that the information used to indicate the total data volume may be a data volume identifier; and the data volume identifier may not accurately indicate 2 M, and may indicate a data volume range, for example, 2 M to 3 M.

Figure 5:
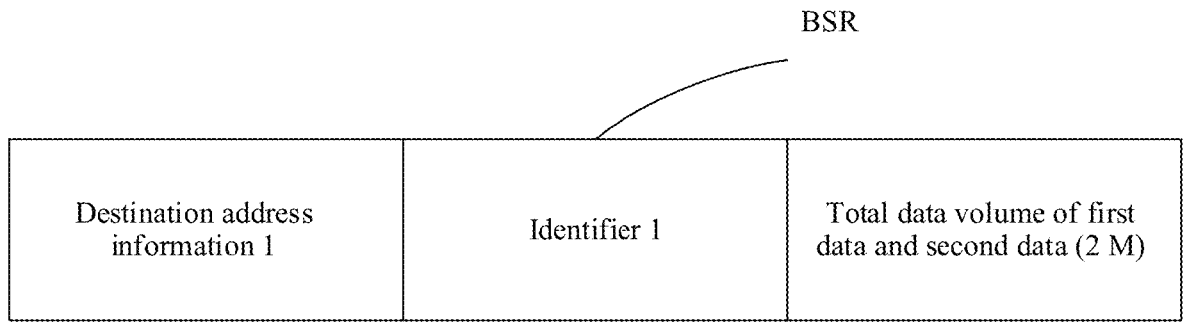
FIG. 5 is a schematic structural diagram of a BSR according to an embodiment of this application.

For another example, the BSR includes the identifier, the destination address information corresponding to the first data, and the data volume of all data that is in the terminal device and that corresponds to both the destination address information and the identifier. As shown in FIG. 5, first data, second data, and third data all correspond to an identifier 1, destination address information corresponding to the first data is destination address information 1, destination address information corresponding to the second data is also the destination address information 1, and destination address information corresponding to the third data is destination address information 2. Therefore, the BSR includes the identifier 1, the destination address information 1, and information used to indicate a total data volume of 2 M of the first data and the second data.

Because the BSR is dynamically sent, in this implementation, the terminal device may dynamically send, to the network device, the identifier and the total data volume of all data corresponding to the identifier, or may dynamically send, to the network device, the identifier, the destination address information corresponding to the first data, and/or the data volume of all data that is in the terminal device and that corresponds to both the destination address information and the identifier. Therefore, the network device may dynamically perform a related operation based on the identifier and the total data volume of all data corresponding to the identifier, or based on the destination address information corresponding to the first data and/or the data volume of all data that is in the terminal device and that corresponds to both the destination address information and the identifier.

303: The network device determines the QoS parameter.

Specifically, after receiving the identifier from the terminal device, the network device determines the QoS parameter. The QoS parameter corresponds to the identifier.

Specifically, the network device stores the correspondence between an identifier and a QoS parameter. After receiving the identifier, the network device determines, based on the correspondence between an identifier and a QoS parameter, the QoS parameter corresponding to the identifier.

For example, the network device stores the correspondence shown in the foregoing Table 1. After receiving the identifier 1, the network device finds, from the correspondence shown in Table 1, the QoS parameter corresponding to the identifier 1. Therefore, the QoS parameter determined by the network device is the reliability information 1, the latency information 1, the communication distance information 1, the data rate information 1, and the data priority information 1.

For another example, the network device stores the correspondence shown in the foregoing Table 2. After receiving the identifier 1, the network device finds, from the correspondence shown in Table 2, the QoS parameter corresponding to the identifier 1. Therefore, the network device determines that the terminal device has at least one of data of the QoS parameter including the reliability information 1, the latency information 1, the communication distance information 1, the data rate information 1, and the data priority information 1 and data of the QoS parameter including the reliability information 2, the latency information 1, the communication distance information 1, the data rate information 1, and the data priority information 1. In this case, the network device may not determine in detail whether the QoS parameter is the reliability information 1, the latency information 1, the communication distance information 1, the data rate information 1, and the data priority information 1 or the QoS parameter is the reliability information 2, the latency information 1, the communication distance information 1, the data rate information 1, and the data priority information 1 or the terminal device has data of both of the foregoing two QoS parameters. However, in this case, overheads can be effectively reduced.

It can be learned that through implementation of the method described in FIG. 3, the terminal device may send, to the network device, the identifier corresponding to the QoS parameter. Therefore, after receiving the identifier, the network device may determine the corresponding QoS parameter based on the identifier. Therefore, through implementation of the method described in FIG. 3, the terminal device can provide a quality of service requirement for the network device. In addition, the QoS parameter is indicated by using the identifier instead of being directly transmitted, and this helps reduce overheads.

Figure 6:
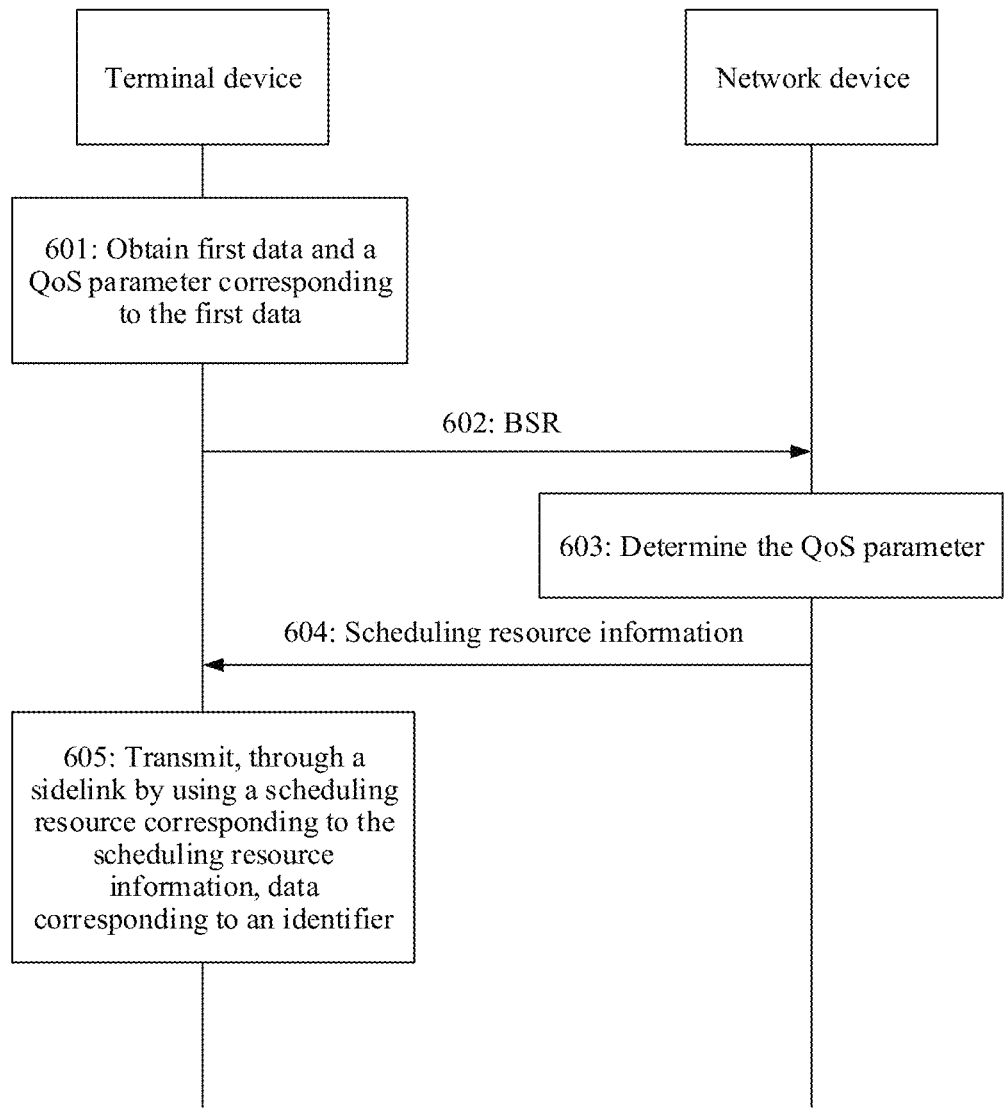
FIG. 6 to FIG. 9 are schematic flowcharts of communication methods according to embodiments of this application.

FIG. 6 is a schematic flowchart of another communication method according to an embodiment of this application. As shown in FIG. 6, the communication method includes the following parts 601 to 605.

601: A terminal device obtains first data and a QoS parameter corresponding to the first data.

In this embodiment of this application, the QoS parameter includes at least one of reliability information, latency information, communication distance information, data rate information, and service type information.

A specific implementation and an optional implementation of 601 are the same as the specific implementation and the optional implementation of 301 in the foregoing method embodiment. For details, refer to the corresponding descriptions in the foregoing method embodiment. Details are not described herein again.

602: The terminal device sends a BSR to a network device.

The BSR includes an identifier, and the identifier corresponds to the QoS parameter. Optionally, the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier.

Specifically, the terminal device stores a correspondence between an identifier and a QoS parameter. After obtaining the QoS parameter, the terminal device obtains, based on the correspondence between an identifier and a QoS parameter, the identifier corresponding to the QoS parameter, adds the identifier corresponding to the QoS parameter into the BSR, and sends the BSR to the network device.

For a specific principle of obtaining the identifier corresponding to the QoS parameter by the terminal device, refer to the example corresponding to Table 1. Details are not described herein again.

Optionally, the identifier may be one of a logical channel group identifier, a QCI index, and a flow identifier.

For how to configure the correspondence, in the terminal device, between an identifier and a QoS parameter, refer to the corresponding descriptions in the foregoing method embodiment. Details are not described herein again.

For related descriptions of the BSR, specifically refer to the descriptions of the BSR in the foregoing method embodiment. Details are not described herein again.

603: The network device determines the QoS parameter.

The QoS parameter corresponds to the identifier.

Specifically, after receiving the BSR from the terminal device, the network device obtains the identifier form the BSR, and determines, based on the correspondence between an identifier and a QoS parameter, the QoS parameter corresponding to the identifier.

For a specific implementation of determining the QoS parameter by the network device, refer to the corresponding descriptions of 303 in the foregoing method embodiment. Details are not described herein again.

604: The network device sends scheduling resource information to the terminal device.

In this embodiment of this application, after determining the QoS parameter, the network device sends the scheduling resource information to the terminal device. A scheduling resource corresponding to the scheduling resource information has a subcarrier spacing and/or a transmission time interval.

Optionally, the network device may allocate the scheduling resource based on the QoS parameter determined in 603. Optionally, the network device stores a correspondence between a subcarrier spacing and/or a transmission time interval and an identifier, and the subcarrier spacing and/or the transmission time interval of the scheduling resource allocated by the network device correspond/corresponds to the identifier received by the network device. For example, the identifier in the BSR received by the network device is an identifier 1, and the identifier 1 corresponds to the subcarrier spacing and/or the transmission time interval of the scheduling resource allocated by the network device.

605: The terminal device transmits, through a sidelink by using the scheduling resource corresponding to the scheduling resource information, data corresponding to the identifier.

In this embodiment of this application, after receiving the scheduling resource information sent by the network device, the terminal device transmits, through the sidelink by using the scheduling resource corresponding to the scheduling resource information, the data corresponding to the identifier. The identifier corresponds to the subcarrier spacing and/or the transmission time interval. The data corresponding to the identifier is data corresponding to the QoS parameter that corresponds to the identifier.

In this embodiment of this application, the terminal device stores the correspondence between a subcarrier spacing and/or a transmission time interval and an identifier. After receiving the scheduling resource information sent by the network device, the terminal device may obtain the subcarrier spacing and/or the transmission time interval of the scheduling resource corresponding to the scheduling resource information, and obtain, based on the correspondence between a subcarrier spacing and/or a transmission time interval and an identifier, the identifier corresponding to the subcarrier spacing and/or the transmission time interval. The terminal device transmits, through the sidelink by using the scheduling resource corresponding to the scheduling resource information, the data corresponding to the identifier.

The correspondence between a subcarrier spacing and/or a transmission time interval and an identifier may include a plurality of cases. The correspondence may be a one-to-one, one-to-many, many-to-one, or many-to-many correspondence. This is not limited in this application.

It should be noted that data corresponding to a plurality of identifiers may be loaded on the scheduling resource. This is not limited in this application, provided that the subcarrier spacing and/or the transmission time interval of the scheduling resource support/supports the data corresponding to the plurality of identifiers. In addition, because a size of the scheduling resource may be variable, and data corresponding to different identifiers may have specific priorities during data encapsulation, a quantity of QoS parameters whose data is carried on the scheduling resource and a data volume of the carried data are not limited in this application either.

For example, the terminal device stores a correspondence shown in the following Table 3. If the subcarrier spacing and/or the transmission time interval of the scheduling resource corresponding to the scheduling resource information received by the terminal device is a subcarrier spacing 1 and/or a transmission time interval 1, the terminal device finds, based on the correspondence in the following Table 3, that the subcarrier spacing 1 and/or the transmission time interval 1 correspond/corresponds to an identifier 1. The terminal device transmits, through the sidelink by using the scheduling resource corresponding to the scheduling resource information, data corresponding to the identifier 1.

TABLE 3

| Identifier | Subcarrier spacing and/or transmission time interval |
| --- | --- |
| Identifier 1 | Subcarrier spacing 1 and/or transmission time interval 1 |
| Identifier 2 | Subcarrier spacing 2 and/or transmission time interval 2 |
| Identifier 3 | Subcarrier spacing 1 and/or transmission time interval 3 |

Optionally, as shown in the following Table 4, a single identifier may correspond to at least one subcarrier spacing and/or at least one transmission time interval. For example, an identifier 1 corresponds to both a subcarrier spacing 1 and/or a transmission time interval 1 and a subcarrier spacing 2 and/or a transmission time interval 1. Data corresponding to the identifier 1 may be loaded on a scheduling resource of the subcarrier spacing 1 and/or the transmission time interval 1, or may be loaded on a scheduling resource of the subcarrier spacing 2 and/or the transmission time interval 1.

TABLE 4

| Identifier | Subcarrier spacing and/or transmission time interval |
| --- | --- |
| Identifier 1 | Subcarrier spacing 1 and/or transmission time interval 1 |
| | Subcarrier spacing 2 and/or transmission time interval 1 |
| Identifier 2 | Subcarrier spacing 2 and/or transmission time interval 2 |
| Identifier 3 | Subcarrier spacing 3 and/or transmission time interval 3 |

Optionally, the network device may send a second message to the terminal device, where the second message includes the correspondence between a subcarrier spacing and/or a transmission time interval and an identifier. Correspondingly, the terminal device may receive the second message. After receiving the second message sent by the network device, the terminal device may store the correspondence, included in the second message, between a subcarrier spacing and/or a transmission time interval and an identifier. In other words, in this implementation, the correspondence, stored in the terminal device, between a subcarrier spacing and/or a transmission time interval and an identifier is configured by the network device.

Optionally, the correspondence, stored in the terminal device, between a subcarrier spacing and/or a transmission time interval and an identifier may be preconfigured. For example, the correspondence between a subcarrier spacing and/or a transmission time interval and an identifier is specified in a protocol. Alternatively, a device vendor may preconfigure the correspondence between a subcarrier spacing and/or a transmission time interval and an identifier into the terminal device before delivery of the terminal device. Alternatively, when the terminal device accesses a network, the network device may preconfigure the correspondence between a subcarrier spacing and/or a transmission time interval and an identifier into the terminal device.

Optionally, the correspondence between a subcarrier spacing and/or a transmission time interval and an identifier is preconfigured for the terminal device; and after the terminal device receives the second message that is sent by the network device and that includes the correspondence between a subcarrier spacing and/or a transmission time interval and an identifier, the terminal device replaces the preconfigured correspondence between a subcarrier spacing and/or a transmission time interval and an identifier with the correspondence, included in the second message, between a subcarrier spacing and/or a transmission time interval and an identifier. In other words, after receiving the second message sent by the network device, the terminal device may update the preconfigured correspondence between a subcarrier spacing and/or a transmission time interval and an identifier with the correspondence, included in the second message, between a subcarrier spacing and/or a transmission time interval and an identifier.

Optionally, the correspondence between a subcarrier spacing and/or a transmission time interval and an identifier may be implicit or explicit.

For example, the correspondence is implicit. The identifier may have a specific sequence, and the sequence may be stipulated in a protocol. In this case, the second message may not include the identifier. For example, it is assumed that the identifier is a logical channel identifier. The first message includes {subcarrier spacing 1, subcarrier spacing 2}, {subcarrier spacing 2, subcarrier spacing 3}, and {subcarrier spacing 3}. It is stipulated in the protocol that logical channel identifiers are in ascending order, so that a logical channel identifier 1 to a logical channel identifier 3 respectively and sequentially correspond to the foregoing items.

For another example, the correspondence in the second message is explicit; and it is assumed that the identifier is a logical channel identifier. The first message includes {subcarrier spacing 1, subcarrier spacing 2, logical channel identifier 1}, {subcarrier spacing 2, subcarrier spacing 3, logical channel identifier 2}, and {subcarrier spacing 3, logical channel identifier 3}. In the {subcarrier spacing 1, subcarrier spacing 2, logical channel identifier 1}, the logical channel identifier 1 corresponds to the subcarrier spacing 1 and the subcarrier spacing 2, and it indicates that the data corresponding to the identifier is allowed to be loaded on a resource whose subcarrier spacing is 1 or 2. Descriptions of other information included in the second message is similar to the descriptions of the {subcarrier spacing 1, subcarrier spacing 2, logical channel identifier 1}.

The subcarrier spacing is information used to indicate or point to a subcarrier spacing, and may be but is not limited to an identifier, an index, or other information that points to the subcarrier spacing.

The transmission time interval is information used to indicate or point to a transmission time interval, and may be but is not limited to an identifier, an index, or other information that points to the transmission time interval. Optionally, the transmission time interval may be a sidelink shared transmission time.

It can be learned that through implementation of the method described in FIG. 6, the terminal device may dynamically request the scheduling resource from the network device, and the network device may dynamically allocate the scheduling resource to the terminal device. After receiving the scheduling resource information, the terminal device may transmit, by using the scheduling resource corresponding to the scheduling resource information, the corresponding data.

Figure 7:
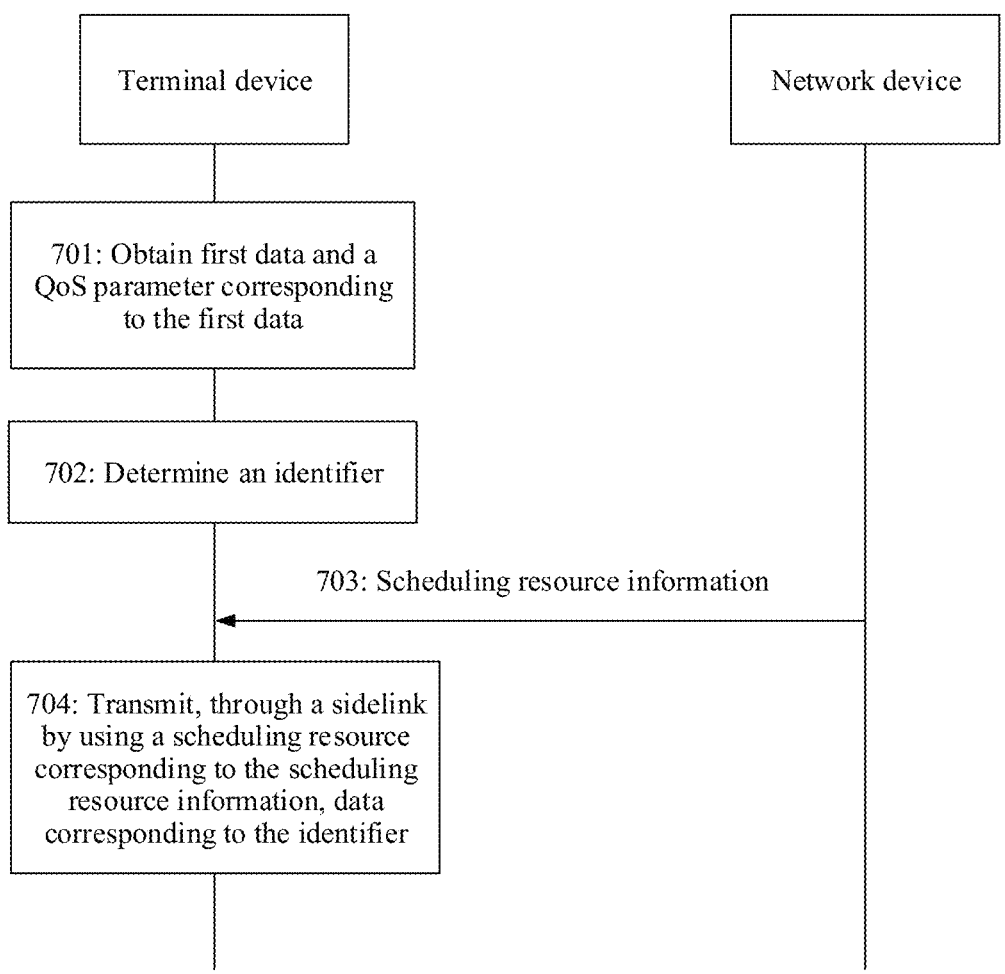

FIG. 7 is a schematic flowchart of another communication method according to an embodiment of this application. As shown in FIG. 7, the communication method includes the following parts 701 to 704.

701: A terminal device obtains first data and a QoS parameter corresponding to the first data.

In this embodiment of this application, the QoS parameter includes at least one of reliability information, latency information, communication distance information, data rate information, and service type information.

A specific implementation and an optional implementation of 701 are the same as the specific implementation and the optional implementation of 301 in the foregoing method embodiment. For details, refer to the corresponding descriptions in the foregoing method embodiment. Details are not described herein again.

702: The terminal device determines an identifier.

The identifier corresponds to the QoS parameter. Specifically, the terminal device stores a correspondence between an identifier and a QoS parameter. After obtaining the QoS parameter, the terminal device determines, based on the correspondence between an identifier and a QoS parameter, the identifier corresponding to the QoS parameter.

703: A network device sends scheduling resource information to the terminal device.

The network device may configure the scheduling resource information. A scheduling resource corresponding to the scheduling resource information has a subcarrier spacing and/or a transmission time interval.

Optionally, the network device may configure the corresponding scheduling resource based on the QoS parameter.

704: The terminal device transmits, through a sidelink by using the scheduling resource corresponding to the scheduling resource information, data corresponding to the identifier.

In this embodiment of this application, after receiving the scheduling resource information sent by the network device, the terminal device transmits, through the sidelink by using the scheduling resource corresponding to the scheduling resource information, the data corresponding to the identifier. The identifier corresponds to the subcarrier spacing and/or the transmission time interval. The data corresponding to the identifier is data corresponding to the QoS parameter that corresponds to the identifier.

Optionally, parts 701 and 702 may be performed after the terminal device receives the scheduling resource information sent by the network device, or may be performed before the terminal device receives the scheduling resource information sent by the network device. This is not limited in this embodiment of this application.

For example, the network device may configure a scheduling resource 1 corresponding to a QoS parameter 1 and a scheduling resource 2 corresponding to a QoS parameter 2, and then sends, to the terminal device, scheduling resource information corresponding to the scheduling resource 1 and scheduling resource information corresponding to the scheduling resource 2. The terminal device stores a correspondence between a subcarrier spacing and an identifier. The correspondence is that a subcarrier spacing 1 corresponds to an identifier 1, and a subcarrier spacing 2 corresponds to an identifier 2. If a subcarrier spacing of the scheduling resource 1 is the subcarrier spacing 1, and a subcarrier spacing of the scheduling resource 2 is the subcarrier spacing 2, after the terminal device receives the scheduling resource information corresponding to the scheduling resource 1 and the scheduling resource information corresponding to the scheduling resource 2, if the identifier determined based on the QoS parameter of the first data is the identifier 1, the terminal device selects, from the scheduling resource 1 and the scheduling resource 2, the scheduling resource 1 to send data corresponding to the identifier 1.

For a manner of configuring the correspondence, in the terminal device, between a subcarrier spacing and/or a transmission time interval and an identifier, refer to the corresponding descriptions in FIG. 6. Details are not described herein again.

It can be learned that through implementation of the method described in FIG. 7, the terminal device does not dynamically apply to the network device for the scheduling resource, and the network device can configure a resource set for the terminal device. Therefore, the terminal device can independently select the appropriate scheduling resource from the resource set to transmit the corresponding data. The network device can statically or semi-statically configure the resource set, and the resource set may include but is not limited to a resource pool or a semi-statically scheduled resource. The resource set includes several time-frequency resources.

Figure 8:
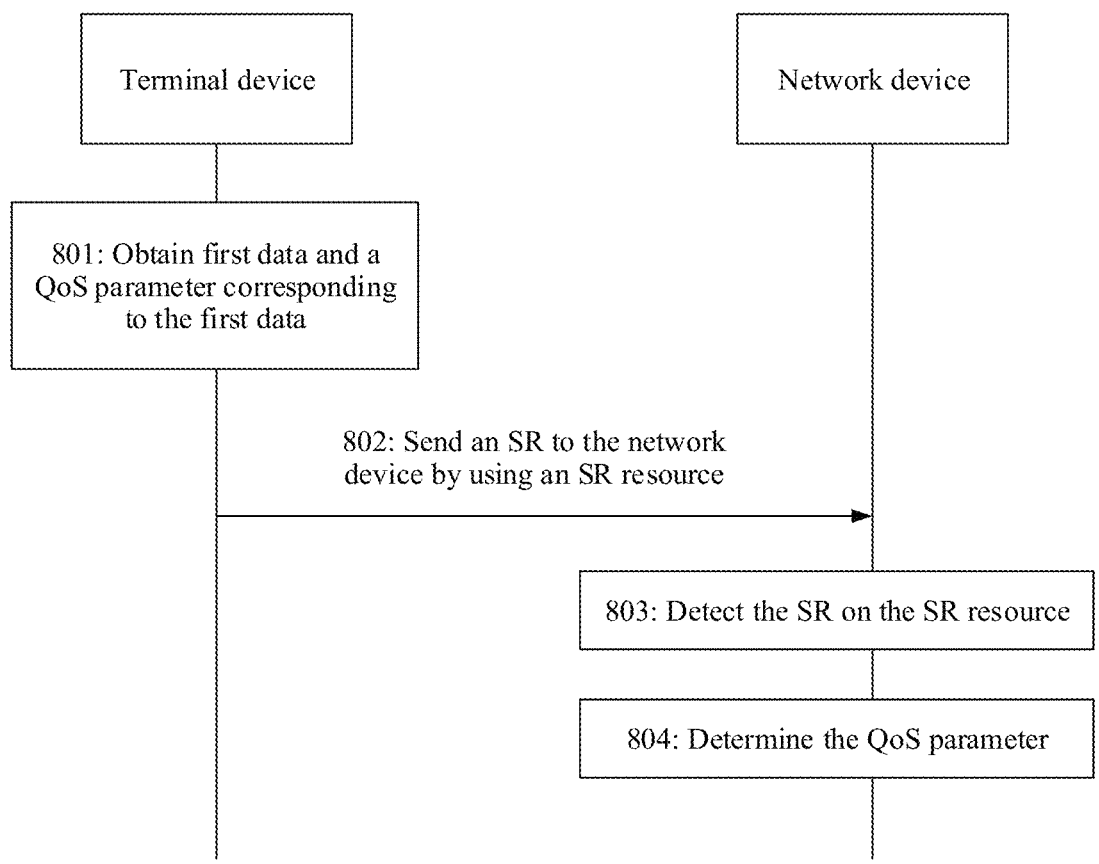

FIG. 8 is a schematic flowchart of a communication method according to an embodiment of this application. As shown in FIG. 8, the communication method includes the following parts 801 to 804.

801: A terminal device obtains first data and a QoS parameter corresponding to the first data.

In this embodiment of this application, the QoS parameter includes at least one of reliability information, latency information, communication distance information, data rate information, and service type information.

Optionally, the QoS parameter further includes data priority information. In this implementation, the terminal device can indicate at least two types of QoS parameters to a network device. Therefore, this helps the network device to schedule, for the terminal, resources that meet various quality of service requirements of sidelink data transmission.

A specific implementation and an optional implementation of 801 are the same as the specific implementation and the optional implementation of 301 in the foregoing method embodiment. For details, refer to the corresponding descriptions in the foregoing method embodiment. Details are not described herein again.

802: The terminal device sends an SR to the network device by using an SR resource.

Optionally, the SR resource corresponds to an identifier, and the identifier corresponds to the QoS parameter.

Specifically, the terminal device stores a correspondence between an identifier and a QoS parameter, and a correspondence between an SR resource and an identifier. After determining the QoS parameter, the terminal device may determine, based on the correspondence between an identifier and a QoS parameter, the identifier corresponding to the QoS parameter.

For the correspondence between an identifier and a QoS parameter in the embodiment described in FIG. 8, refer to the descriptions of the correspondence between an identifier and a QoS parameter in the embodiment described in FIG. 3. Details are not described herein again.

For example, the terminal device stores a correspondence shown in the foregoing Table 1, and a correspondence shown in the following Table 5. If the QoS parameter is reliability information 1, latency information 1, communication distance information 1, data rate information 1, and data priority information 1, after obtaining the QoS parameter, the terminal device finds, from the correspondence shown in Table 1, an identifier 1 corresponding to the QoS parameter. After the terminal device finds the identifier 1, the terminal device finds, from the correspondence shown in Table 5, an SR resource 1 corresponding to the identifier 1, and sends the SR by using the SR resource 1.

TABLE 5

| Identifier | SR resource |
|---|---|
| Identifier 1 | SR resource 1 |
| Identifier 2 | SR resource 2 |
| Identifier 3 | SR resource 2 |

Optionally, the identifier may be one of a logical channel group identifier, a QCI index, and a flow identifier.

Optionally, the network device may send a first message to the terminal device, where the first message includes the correspondence between an identifier and a QoS parameter and the correspondence between an SR resource and an identifier. The terminal device may receive the first message sent by the network device. After receiving the first message sent by the network device, the terminal device may store the correspondence, included in the first message, between an identifier and a QoS parameter and the correspondence, included in the first message, between an SR resource and an identifier. In other words, in this implementation, the correspondence, stored in the terminal device, between an identifier and a QoS parameter and the correspondence, stored in the terminal device, between an SR resource and an identifier are configured by the network device.

Optionally, the first message may be RRC signaling. The RRC signaling may be a system information block (system information block, SIB) or dedicated RRC (dedicated RRC) signaling. Optionally, the correspondence between an identifier and a QoS parameter and the correspondence between an SR resource and an identifier may be sent by using different RRC signaling.

Optionally, the correspondence, in the first message, between an identifier and a QoS parameter and the correspondence, in the first message, between an SR resource and an identifier may be implicit or explicit.

For example, the correspondence, in the first message, between an identifier and a QoS parameter is implicit. The identifier may have a specific sequence, and the sequence may be stipulated in a protocol. In this case, the first message may not include the identifier. For example, it is assumed that the identifier is a logical channel group identifier and the QoS parameter includes the latency information and the data priority information. The first message includes {latency information 1, data priority information 1}, {latency information 2, data priority information 2}, and {latency information 3, data priority information 3}. It is stipulated in the protocol that logical channel group identifiers are in ascending order, so that a logical channel group identifier 1 to a logical channel group identifier 3 respectively and sequentially correspond to the foregoing items.

For another example, the correspondence, in the first message, between an identifier and an SR resource is implicit. The identifier may have a specific sequence, and the sequence may be stipulated in a protocol. In this case, the first message may not include the identifier. For example, it is assumed that the identifier is a logical channel group identifier. The first message includes {SR resource 1}, {SR resource 2}, and {SR resource 3}. It is stipulated in the protocol that logical channel group identifiers are in ascending order, so that a logical channel group identifier 1 to a logical channel group identifier 3 respectively and sequentially correspond to the foregoing items.

For another example, the correspondence, in the first message, between an identifier and a QoS parameter is explicit; and it is assumed that the identifier is a logical channel group identifier and the QoS parameter includes the latency information and the data priority information. The first message includes {latency information 1, data priority information 1, logical channel group identifier 1}, {latency information 2, data priority information 2, logical channel group identifier 2}, and {latency information 3, data priority information 3, logical channel group identifier 3}. In the {latency information 1, data priority information 1, logical channel group identifier 1}, the logical channel group identifier 1 corresponds to the latency information 1 and the data priority information 1. In the {latency information 2, data priority information 2, logical channel group identifier 2}, the logical channel group identifier 2 corresponds to the latency information 2 and the data priority information 2. In the {latency information 3, data priority information 3, logical channel group identifier 3}, the logical channel group identifier 3 corresponds to the latency information 3 and the data priority information 3.

For another example, the correspondence, in the first message, between an identifier and an SR resource is explicit; and it is assumed that the identifier is a logical channel group identifier. The first message includes {SR resource 1, logical channel group identifier 1}, {SR resource 2, logical channel group identifier 2}, and {SR resource 3, logical channel group identifier 3}. In the {SR resource 1, logical channel group identifier 1}, the logical channel group identifier 1 corresponds to the SR resource 1. In the {SR resource 2, logical channel group identifier 2}, the logical channel group identifier 2 corresponds to the SR resource 2. In the {SR resource 3, logical channel group identifier 3}, the logical channel group identifier 3 corresponds to the SR resource 3.

Optionally, the correspondence, stored in the terminal device, between an identifier and a QoS parameter and the correspondence, stored in the terminal device, between an SR resource and an identifier may be preconfigured. For example, the correspondence between an identifier and a QoS parameter, and the correspondence between an SR resource and an identifier are specified in a protocol. Alternatively, a device vendor may preconfigure the correspondence between an identifier and a QoS parameter and the correspondence between an SR resource and an identifier into the terminal device before delivery of the terminal device. Alternatively, when the terminal device accesses a network, the network device may preconfigure the correspondence between an identifier and a QoS parameter and the correspondence between an SR resource and an identifier into the terminal device.

Optionally, the correspondence between an identifier and a QoS parameter and the correspondence between an SR resource and an identifier are preconfigured for the terminal device; and after the terminal device receives the first message that is sent by the network device and that includes the correspondence between an identifier and a QoS parameter and the correspondence between an SR resource and an identifier, the terminal device replaces the preconfigured correspondence between an identifier and a QoS parameter and the preconfigured correspondence between an SR resource and an identifier with the correspondence, included in the first message, between an identifier and a QoS parameter and the correspondence, included in the first message, between an SR resource and an identifier. In other words, after receiving the first message sent by the network device, the terminal device may update the preconfigured correspondence between an identifier and a QoS parameter and the preconfigured correspondence between an SR resource and an identifier with the correspondence, included in the first message, between an identifier and a QoS parameter and the correspondence, included in the first message, between an SR resource and an identifier.

Optionally, the SR resource corresponds to the QoS parameter.

Specifically, the terminal device stores a correspondence between an SR resource and a QoS parameter. After determining the QoS parameter, the terminal device may determine, based on the correspondence between an SR resource and a QoS parameter, the SR resource corresponding to the QoS parameter.

For example, the terminal device stores a correspondence shown in the following Table 6. The QoS parameter is the latency information. An SR resource 1 corresponds to latency information 1, and an SR resource 2 corresponds to latency information 2 and latency information 3. After learning that the QoS parameter is the latency information 1, the terminal device finds, from the correspondence shown in Table 6, the SR resource 1 corresponding to the latency information 1, and sends the SR by using the SR resource 1.

TABLE 6

| SR resource | QoS parameter |
| --- | --- |
| SR resource 1 | Latency information 1 |
| SR resource 2 | Latency information 2, latency information 3 |

Optionally, the network device may send a first message to the terminal device, where the first message includes the correspondence between an SR resource and a QoS parameter. The terminal device may receive the first message sent by the network device. After receiving the first message sent by the network device, the terminal device may store the correspondence, included in the first message, between an SR resource and a QoS parameter. In other words, in this implementation, the correspondence, stored in the terminal device, between an SR resource and a QoS parameter is configured by the network device.

Optionally, the first message including the correspondence between an SR resource and a QoS parameter may be RRC signaling. The RRC signaling may be a SIB or dedicated RRC signaling.

Optionally, the correspondence, in the first message, between an SR resource and a QoS parameter may be implicit or explicit.

Optionally, the correspondence, stored in the terminal device, between an SR resource and a QoS parameter may be preconfigured. For example, the correspondence between an SR resource and a QoS parameter is specified in a protocol. Alternatively, a device vendor may preconfigure the correspondence between an SR resource and a QoS parameter into the terminal device before delivery of the terminal device. Alternatively, when the terminal device accesses a network, the network device may preconfigure the correspondence between an SR resource and a QoS parameter into the terminal device.

Optionally, the correspondence between an SR resource and a QoS parameter is preconfigured for the terminal device; and after the terminal device receives the first message that is sent by the network device and that includes the correspondence between an SR resource and a QoS parameter, the terminal device replaces the preconfigured correspondence between an SR resource and a QoS parameter with the correspondence, included in the first message, between an SR resource and a QoS parameter. In other words, after receiving the first message sent by the network device, the terminal device may update the preconfigured correspondence between an SR resource and a QoS parameter with the correspondence, included in the first message, between an SR resource and a QoS parameter.

Optionally, the SR resource used by the terminal device to send the SR is an SR resource that is in a plurality of SR resources corresponding to the identifier and that corresponds to a data volume of the first data. After detecting the SR on the SR resource, the network device determines the data volume, where the data volume corresponds to the SR resource. In this implementation, the terminal device can provide the data volume of the first data for the network device.

Optionally, the data volume of the first data may include but is not limited to a data volume of a buffer corresponding to the first data.

In other words, in this implementation, one identifier may correspond to a plurality of SR resources. For example, an identifier 1 corresponds to an SR resource 1 and an SR resource 2. In this implementation, the terminal device and the network device have a correspondence between a data volume and an SR resource.

For example, as shown in the following Table 7, a QoS parameter corresponds to an identifier, and one identifier may correspond to a plurality of SR resources. As shown in the following Table 8, a data volume corresponds to an SR resource. If the QoS parameter corresponding to the first data is latency information 1, the terminal device determines, based on a correspondence in the following Table 7, that the latency information 1 corresponds to an identifier 1, and determines that the identifier 1 corresponds to an SR resource 1 and an SR resource 2. If the data volume of the first data is greater than 2 M, the terminal device determines, from the SR resource 1 and the SR resource 2 based on a correspondence in the following Table 8, that the SR resource 1 corresponds to the data volume greater than 2 M. Therefore, the terminal device sends the SR by using the SR resource 1. Correspondingly, after detecting the SR on the SR resource 1, the network device determines, based on the correspondence between a data volume and an SR resource, that the data volume corresponding to the SR resource 1 is greater than 2 M.

TABLE 7

| QoS parameter | Identifier | SR resource |
| --- | --- | --- |
| Latency information 1 | Identifier 1 | SR resource 1, SR resource 2 |
| Latency information 2, latency information 3 | Identifier 2 | SR resource 3 |
| Latency information 4, latency information 5 | Identifier 3 | SR resource 4 |

TABLE 8

| SR resource | Data volume |
| --- | --- |
| SR resource 1 | Greater than 2M |
| SR resource 2 | Less than 2M |
| SR resource 3 | Greater than 2M |
| SR resource 4 | Less than 2M |

Optionally, the SR resource used by the terminal device to send the SR is an SR resource that is in a plurality of SR resources corresponding to the QoS parameter and that corresponds to the data volume of the first data. After detecting the SR on the SR resource, the network device determines the data volume, where the data volume corresponds to the SR resource. In this implementation, the terminal device can provide the data volume of the first data for the network device.

For example, as shown in the following Table 9, one QoS parameter may correspond to a plurality of SR resources. If the QoS parameter corresponding to the first data is latency information 1, the terminal device determines, based on a correspondence in the following Table 9, that the latency information 1 corresponds to an SR resource 1 and an SR resource 2. If the data volume of the first data is greater than 2 M, the terminal device determines, from the SR resource 1 and the SR resource 2 based on a correspondence in the following Table 10, that the SR resource 1 corresponds to the data volume greater than 2 M. Therefore, the terminal device sends the SR by using the SR resource 1. Correspondingly, after detecting the SR on the SR resource 1, the network device determines, based on the correspondence between a data volume and an SR resource, that the data volume corresponding to the SR resource 1 is greater than 2 M.

TABLE 9

| SR resource | QoS parameter |
| --- | --- |
| SR resource 1, SR resource 2 | Latency information 1 |
| SR resource 3 | Latency information 2, latency information 3 |

TABLE 10

| SR resource | Data volume |
| --- | --- |
| SR resource 1 | Greater than 2M |
| SR resource 2 | Less than 2M |
| SR resource 3 | Greater than 2M |

Optionally, the network device may send a third message to the terminal device, where the third message includes the correspondence between a data volume and an SR resource. The correspondence may be implicit or explicit. The terminal device may receive the third message sent by the network device. After receiving the third message sent by the network device, the terminal device may store the correspondence, included in the third message, between a data volume and an SR resource. In other words, in this implementation, the correspondence, stored in the terminal device, between a data volume and an SR resource is configured by the network device.

Optionally, the correspondence, stored in the terminal device, between a data volume and an SR resource may be preconfigured. For example, the correspondence between a data volume and an SR resource is specified in a protocol. Alternatively, a device vendor may preconfigure the correspondence between a data volume and an SR resource into the terminal device before delivery of the terminal device. Alternatively, when the terminal device accesses a network, the network device may preconfigure the correspondence between a data volume and an SR resource into the terminal device.

Optionally, the correspondence between a data volume and an SR resource is preconfigured for the terminal device; and after the terminal device receives the third message that is sent by the network device and that includes the correspondence between a data volume and an SR resource, the terminal device replaces the preconfigured correspondence between a data volume and an SR resource with the correspondence, included in the third message, between a data volume and an SR resource. In other words, after receiving the third message sent by the network device, the terminal device may update the preconfigured correspondence between a data volume and an SR resource with the correspondence, included in the third message, between a data volume and an SR resource.

Optionally, the network device may send a fourth message to the terminal device, where the fourth message includes a correspondence between a data volume and a pilot sequence. The correspondence may be implicit or explicit. The terminal device may receive the fourth message sent by the network device. After receiving the fourth message sent by the network device, the terminal device may store the correspondence, included in the fourth message, between a data volume and a pilot sequence. In other words, in this implementation, the correspondence, stored in the terminal device, between a data volume and a pilot sequence is configured by the network device.

Optionally, the correspondence, stored in the terminal device, between a data volume and a pilot sequence may be preconfigured. For example, the correspondence between a data volume and a pilot sequence is specified in a protocol. Alternatively, a device vendor may preconfigure the correspondence between a data volume and a pilot sequence into the terminal device before delivery of the terminal device. Alternatively, when the terminal device accesses a network, the network device may preconfigure the correspondence between a data volume and a pilot sequence into the terminal device.

Optionally, the correspondence between a data volume and a pilot sequence is preconfigured for the terminal device; and after receiving the fourth message that is sent by the network device and that includes the correspondence between a data volume and a pilot sequence, the terminal device replaces the preconfigured correspondence between a data volume and a pilot sequence with the correspondence, included in the fourth message, between a data volume and a pilot sequence. In other words, after receiving the fourth message sent by the network device, the terminal device may update the preconfigured correspondence between a data volume and a pilot sequence with the correspondence, included in the fourth message, between a data volume and a pilot sequence.

In this case, the terminal device may send different pilot sequences on a same SR resource to distinguish between data volumes. The network device determines a data volume by detecting a corresponding SR resource and detecting a pilot sequence.

For example, the terminal device stores a correspondence shown in the following Table 11. The QoS parameter is the latency information. An SR resource 1 corresponds to a data volume 1 and a pilot sequence 1, and the SR resource 1 corresponds to a data volume 2 and a pilot sequence 2.

TABLE 11

| SR resource | Data volume | Pilot sequence |
| --- | --- | --- |
| SR resource 1 | Data volume 1 | Pilot sequence 1 |
| SR resource 1 | Data volume 2 | Pilot sequence 2 |

803: The network device detects the SR on the SR resource.

Optionally, the network device further needs to detect a pilot sequence on the SR resource and determine a corresponding data volume based on the detected pilot sequence.

804: The network device determines the QoS parameter.

Optionally, the QoS parameter corresponds to the identifier, and the identifier corresponds to the SR resource.

The network device stores the correspondence between an identifier and a QoS parameter, and the correspondence between an SR resource and an identifier. After detecting the SR on the SR resource, the network device determines, based on the correspondence between an SR resource and an identifier, the identifier corresponding to the SR resource, and then determines, based on the correspondence between an identifier and a QoS parameter, the QoS parameter corresponding to the identifier.

For example, the network device stores the correspondence shown in the foregoing Table 1 and the correspondence shown in Table 3. After detecting the SR on the SR resource 1, the network device finds, from the correspondence shown in Table 3, that the SR resource 1 corresponds to the identifier 1. The network device finds, from the correspondence shown in Table 1, that the identifier 1 corresponds to the reliability information 1, the latency information 1, the communication distance information 1, the data rate information 1, and the data priority information 1. Therefore, the QoS parameter determined by the network device is the reliability information 1, the latency information 1, the communication distance information 1, the data rate information 1, and the data priority information 1.

Alternatively, optionally, there is a correspondence between an SR resource and a QoS parameter, and after detecting the SR on the SR resource, the network device determines, based on the correspondence between an SR resource and a QoS parameter, the QoS parameter corresponding to the identifier.

It can be learned that through implementation of the method described in FIG. 8, the terminal device may determine, based on the QoS parameter, the SR resource for sending the SR, and send the SR on the determined SR resource. Therefore, after detecting the SR on the SR resource, the network device may determine the QoS parameter based on the SR resource. Therefore, through implementation of the method described in FIG. 8, the terminal device can provide a quality of service requirement for the network device. In addition, the QoS parameter is indicated by using the SR resource instead of being directly transmitted, and this helps reduce overheads.

Figure 9:
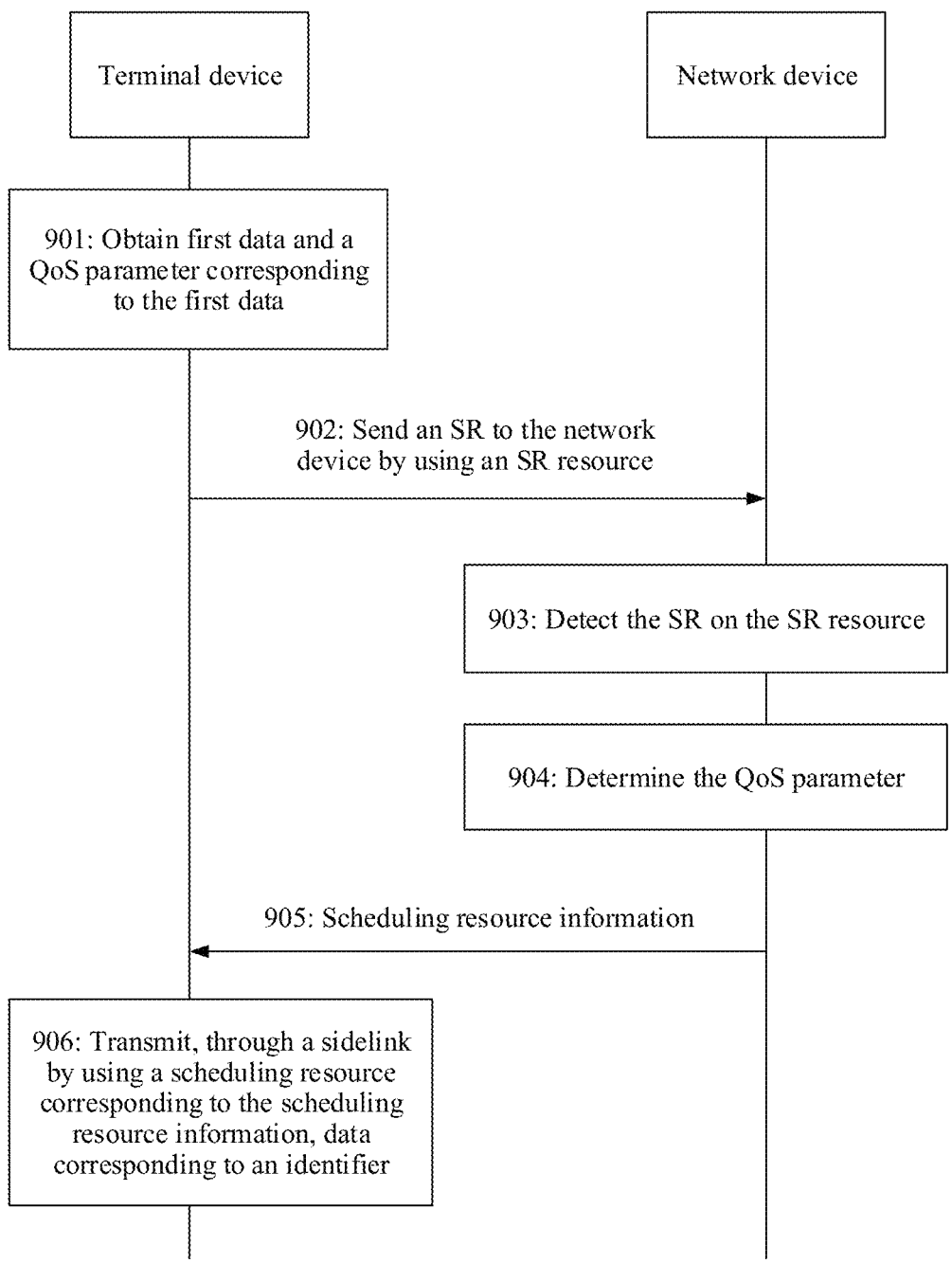

FIG. 9 is a schematic flowchart of a communication method according to an embodiment of this application. As shown in FIG. 9, the communication method includes the following parts 901 to 906.

901: A terminal device obtains first data and a QoS parameter corresponding to the first data.

902: The terminal device sends an SR to a network device by using an SR resource.

903: The network device detects the SR on the SR resource.

904: The network device determines the QoS parameter.

A specific implementation and an optional implementation of parts 901 to 904 are the same as the specific implementation and the optional implementation of parts 801 to 804. Details are not described herein again.

905: The network device sends scheduling resource information to the terminal device.

In this embodiment of this application, after determining the QoS parameter, the network device sends the scheduling resource information to the terminal device. A scheduling resource corresponding to the scheduling resource information has a subcarrier spacing and/or a transmission time interval.

Optionally, the network device may allocate the scheduling resource based on the determined QoS parameter. Optionally, the network device stores a correspondence between a subcarrier spacing and/or a transmission time interval and an identifier, and an identifier determined by the network device based on the QoS parameter corresponds to the subcarrier spacing and/or the transmission time interval of the scheduling resource allocated by the network device.

906: The terminal device transmits, through a sidelink by using the scheduling resource corresponding to the scheduling resource information, data corresponding to the identifier, where the subcarrier spacing and/or the transmission time interval correspond/corresponds to the identifier.

In this embodiment of this application, after receiving the scheduling resource information sent by the network device, the terminal device transmits, through the sidelink by using the scheduling resource corresponding to the scheduling resource information, the data corresponding to the identifier. The identifier corresponds to the subcarrier spacing and/or the transmission time interval. The data corresponding to the identifier is data corresponding to the QoS parameter that corresponds to the identifier.

In this embodiment of this application, the terminal device stores the correspondence between a subcarrier spacing and/or a transmission time interval and an identifier. After receiving the scheduling resource information sent by the network device, the terminal device may obtain the subcarrier spacing and/or the transmission time interval of the scheduling resource corresponding to the scheduling resource information, and obtain, based on the correspondence between a subcarrier spacing and/or a transmission time interval and an identifier, the identifier corresponding to the subcarrier spacing and/or the transmission time interval. The terminal device transmits, through the sidelink by using the scheduling resource corresponding to the scheduling resource information, the data corresponding to the identifier.

For example, the terminal device stores a correspondence shown in the foregoing Table 3. If the subcarrier spacing and/or the transmission time interval of the scheduling resource corresponding to the scheduling resource information received by the terminal device is a subcarrier spacing 1 and/or a transmission time interval 1, the terminal device finds, based on the correspondence in the foregoing Table 3, that the subcarrier spacing 1 and/or the transmission time interval 1 correspond/corresponds to an identifier 1. The terminal device transmits, through the sidelink by using the scheduling resource corresponding to the scheduling resource information, data corresponding to the identifier 1.

For another example, the terminal device further stores a correspondence shown in the foregoing Table 4. A single identifier may correspond to at least one subcarrier spacing and/or at least one transmission time interval.

Optionally, the network device may send a second message to the terminal device, where the second message includes the correspondence between a subcarrier spacing and/or a transmission time interval and an identifier. Correspondingly, the terminal device may receive the second message. After receiving the second message sent by the network device, the terminal device may store the correspondence, included in the second message, between a subcarrier spacing and/or a transmission time interval and an identifier. In other words, in this implementation, the correspondence, stored in the terminal device, between a subcarrier spacing and/or a transmission time interval and an identifier is configured by the network device.

Optionally, the correspondence, stored in the terminal device, between a subcarrier spacing and/or a transmission time interval and an identifier may be preconfigured. For example, the correspondence between a subcarrier spacing and/or a transmission time interval and an identifier is specified in a protocol. Alternatively, a device vendor may preconfigure the correspondence between a subcarrier spacing and/or a transmission time interval and an identifier into the terminal device before delivery of the terminal device. Alternatively, when the terminal device accesses a network, the network device may preconfigure the correspondence between a subcarrier spacing and/or a transmission time interval and an identifier into the terminal device.

Optionally, the correspondence between a subcarrier spacing and/or a transmission time interval and an identifier is preconfigured for the terminal device; and after the terminal device receives the second message that is sent by the network device and that includes the correspondence between a subcarrier spacing and/or a transmission time interval and an identifier, the terminal device replaces the preconfigured correspondence between a subcarrier spacing and/or a transmission time interval and an identifier with the correspondence, included in the second message, between a subcarrier spacing and/or a transmission time interval and an identifier. In other words, after receiving the second message sent by the network device, the terminal device may update the preconfigured correspondence between a subcarrier spacing and/or a transmission time interval and an identifier with the correspondence, included in the second message, between a subcarrier spacing and/or a transmission time interval and an identifier.

Optionally, the correspondence between a subcarrier spacing and/or a transmission time interval and an identifier may be implicit or explicit. For specific descriptions, refer to the corresponding embodiment in FIG. 6. Details are not described herein again.

It can be learned that through implementation of the method described in FIG. 9, the network device may allocate the scheduling resource to the terminal device, and the terminal device may transmit the corresponding data by using the appropriate scheduling resource.

In the embodiments of the present invention, the device may be divided into function modules based on the foregoing method examples. For example, each function module may be obtained through division based on each corresponding function, or two or more functions may be integrated into one module. The integrated module may be implemented in a form of hardware, or may be implemented in a form of a software function module. It should be noted that, in the embodiments of the present invention, module division is an example, and is merely logical function division. During actual implementation, another division manner may be used.

Figure 10:
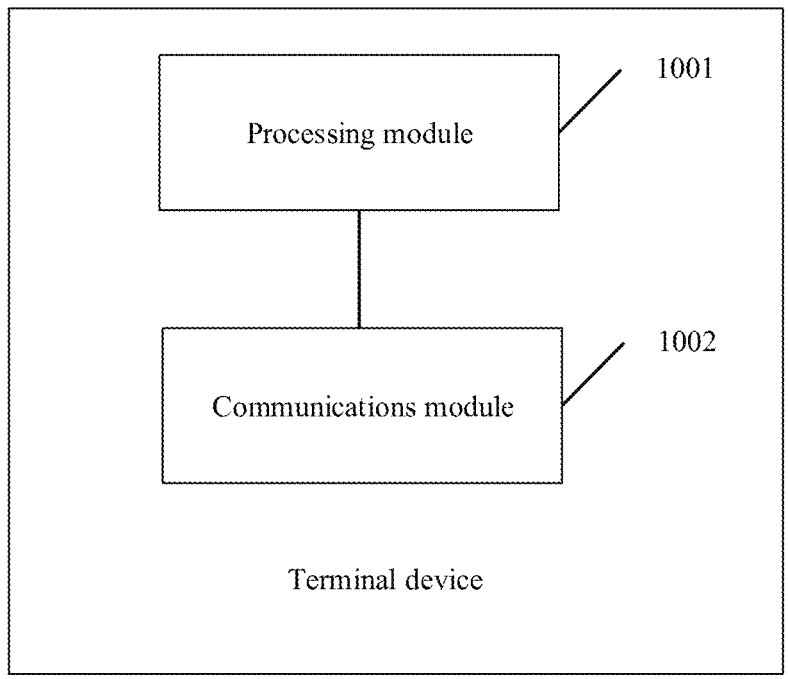
FIG. 10 and FIG. 11 are schematic structural diagrams of terminal devices according to embodiments of this application.

FIG. 10 shows a terminal device according to an embodiment of the present invention. The terminal device includes a processing module 1001 and a communications module 1002.

The processing module 1001 is configured to obtain first data and a quality of service QoS parameter corresponding to the first data, where the QoS parameter includes at least one of reliability information, latency information, communication distance information, data rate information, and service type information. The communications module 1002 is configured to send an identifier to a network device, where the identifier corresponds to the QoS parameter.

Optionally, the QoS parameter further includes data priority information.

Optionally, the communications module 1002 is further configured to receive a first message sent by the network device, where the first message includes a correspondence between an identifier and a QoS parameter.

Optionally, a manner of sending, by the communications module 1002, the identifier to the network device is specifically: sending a buffer status report BSR to the network device, where the BSR includes the identifier, and the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier.

Optionally, the communications module 1002 is further configured to receive scheduling resource information sent by the network device, where a scheduling resource corresponding to the scheduling resource information has a subcarrier spacing and/or a transmission time interval; and the communications module 1002 is further configured to transmit, through a sidelink by using the scheduling resource corresponding to the scheduling resource information, the data corresponding to the identifier, where the subcarrier spacing and/or the transmission time interval correspond/corresponds to the identifier.

Optionally, the communications module 1002 is further configured to receive a second message sent by the network device, where the second message includes a correspondence between a subcarrier spacing and/or a transmission time interval and an identifier.

Figure 11:
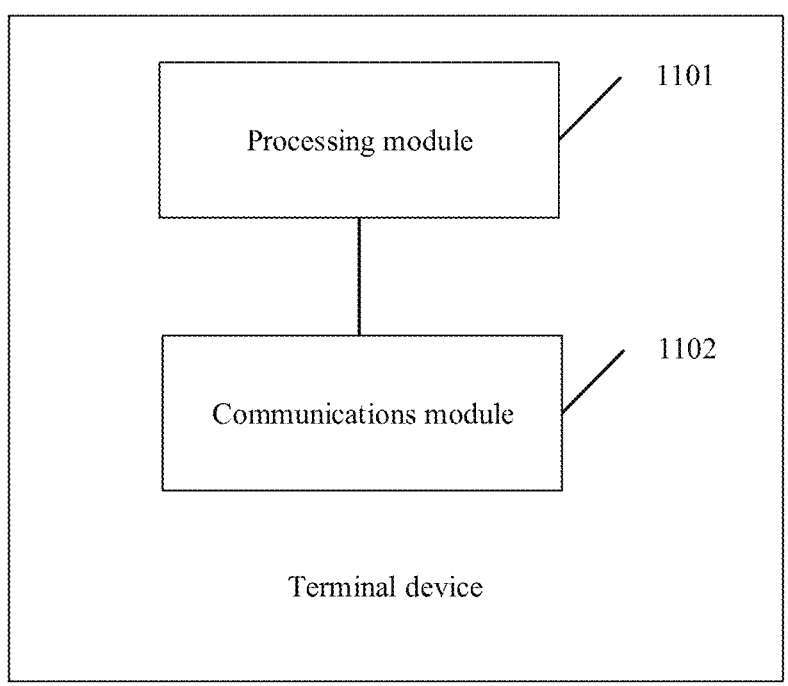

FIG. 11 shows a terminal device according to an embodiment of the present invention. The terminal device includes a processing module 1101 and a communications module 1102.

The processing module 1101 is configured to obtain first data and a quality of service QoS parameter corresponding to the first data, where the QoS parameter includes at least one of reliability information, latency information, communication distance information, data rate information, and service type information. The communications module 1102 is configured to send an SR to a network device by using an SR resource, where the SR resource corresponds to an identifier, and the identifier corresponds to the QoS parameter.

Optionally, the QoS parameter further includes data priority information.

Optionally, the communications module 1102 is further configured to receive a first message sent by the network device, where the first message includes a correspondence between an identifier and a QoS parameter and a correspondence between an SR resource and an identifier.

Optionally, the communications module 1102 is further configured to receive scheduling resource information sent by the network device, where a scheduling resource corresponding to the scheduling resource information has a subcarrier spacing and/or a transmission time interval; and the communications module 1102 is further configured to transmit, through a sidelink by using the scheduling resource corresponding to the scheduling resource information, data corresponding to the identifier, where the subcarrier spacing and/or the transmission time interval correspond/corresponds to the identifier.

Optionally, the communications module 1102 is further configured to receive a second message sent by the network device, where the second message includes a correspondence between a subcarrier spacing and/or a transmission time interval and an identifier.

Optionally, the SR resource is an SR resource that is in a plurality of SR resources corresponding to the identifier and that corresponds to a data volume of the first data.

Figure 12:
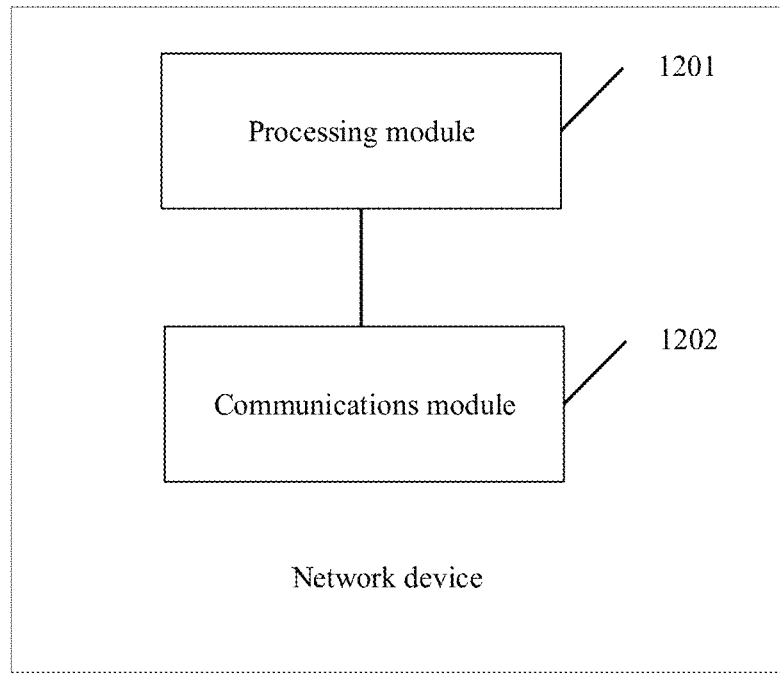
FIG. 12 and FIG. 13 are schematic structural diagrams of network devices according to embodiments of this application.

FIG. 12 shows a network device according to an embodiment of the present invention. The network device includes a processing module 1201 and a communications module 1202.

The communications module 1202 is configured to receive an identifier from a terminal device. The processing module 1201 is configured to determine a QoS parameter, where the QoS parameter corresponds to the identifier, and the QoS parameter includes at least one of reliability information, latency information, communication distance information, data rate information, and service type information.

Optionally, the QoS parameter further includes data priority information.

Optionally, the communications module 1202 is further configured to send a first message to the terminal device, where the first message includes a correspondence between an identifier and a QoS parameter.

Optionally, a manner of receiving, by the communications module 1202, the identifier from the terminal device is specifically: receiving a buffer status report BSR from the terminal device, where the BSR includes the identifier, and the BSR further includes a total data volume of all data that is in the terminal device and that corresponds to the identifier, or the BSR further includes destination address information corresponding to the first data and/or a data volume of all data that is in the terminal device and that corresponds to both the destination address information and the identifier.

Optionally, the communications module 1202 is further configured to send scheduling resource information to the terminal device, where a scheduling resource corresponding to the scheduling resource information has a subcarrier spacing and/or a transmission time interval.

Optionally, the communications module 1202 is further configured to send a second message to the terminal device, where the second message includes a correspondence between a subcarrier spacing and/or a transmission time interval and an identifier.

Figure 13:
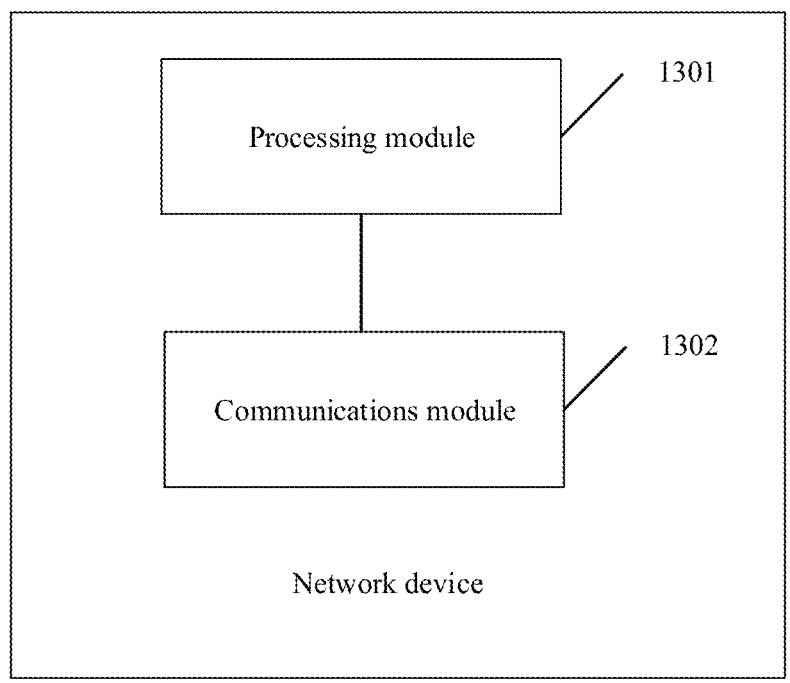

FIG. 13 shows a network device according to an embodiment of the present invention. The network device includes a processing module 1301 and a communications module 1302.

The communications module 1302 is configured to detect an SR on an SR resource. The processing module 1301 is configured to determine a QoS parameter, where the QoS parameter corresponds to an identifier, the identifier corresponds to the SR resource, and the QoS parameter includes at least one of reliability information, latency information, communication distance information, data rate information, and service type information.

Optionally, the QoS parameter further includes data priority information.

Optionally, the communications module 1302 is further configured to send a first message to a terminal device, where the first message includes a correspondence between an identifier and a QoS parameter and a correspondence between an SR resource and an identifier.

Optionally, the communications module 1302 is further configured to send scheduling resource information to the terminal device, where a scheduling resource corresponding to the scheduling resource information has a subcarrier spacing and/or a transmission time interval.

Optionally, the communications module 1302 is further configured to send a second message to the terminal device, where the second message includes a correspondence between a subcarrier spacing and/or a transmission time interval and an identifier.

Optionally, the processing module 1301 is further configured to determine a data volume, where the data volume corresponds to the SR resource.

Figure 14:
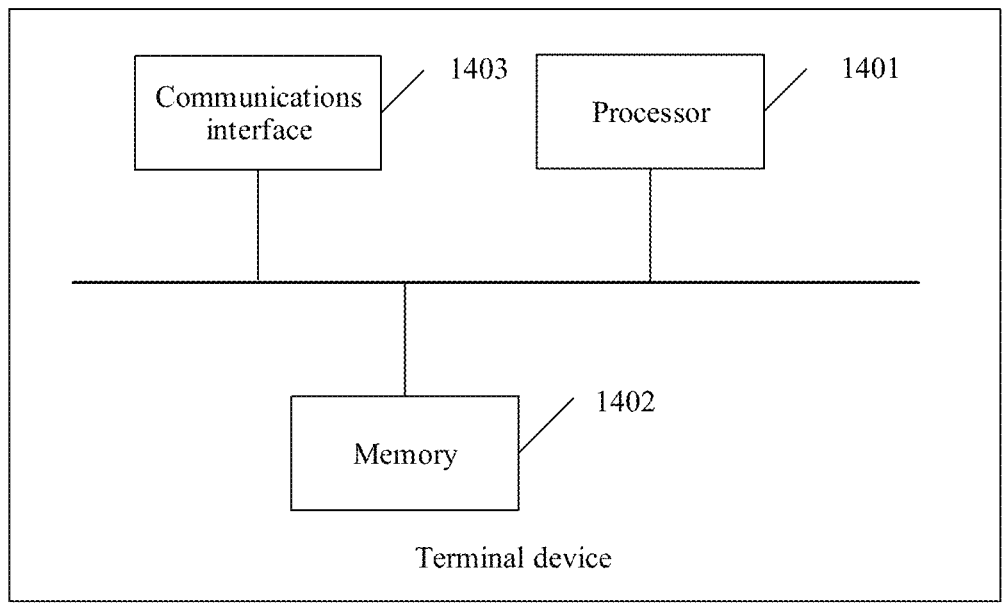
FIG. 14 is a schematic structural diagram of a terminal device according to an embodiment of this application.

FIG. 14 is a schematic structural diagram of a terminal device according to an embodiment of this application. As shown in FIG. 14, the terminal device 1400 includes a processor 1401, a memory 1402, and a communications interface 1403. The processor 1401, the memory 1402, and the communications interface 1403 are connected.

The processor 1401 may be a central processing unit (central processing unit, CPU), a general-purpose processor, a coprocessor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 1401 may be a combination of processors implementing a computing function, for example, a combination of one or more microprocessors, or a combination of the DSP and a microprocessor.

The communications interface 1403 is configured to implement communication with another network element (for example, a network device).

The processor 1401 invokes program code stored in the memory 1402, to perform the steps performed by the terminal device in the foregoing method embodiments.

Figure 15:
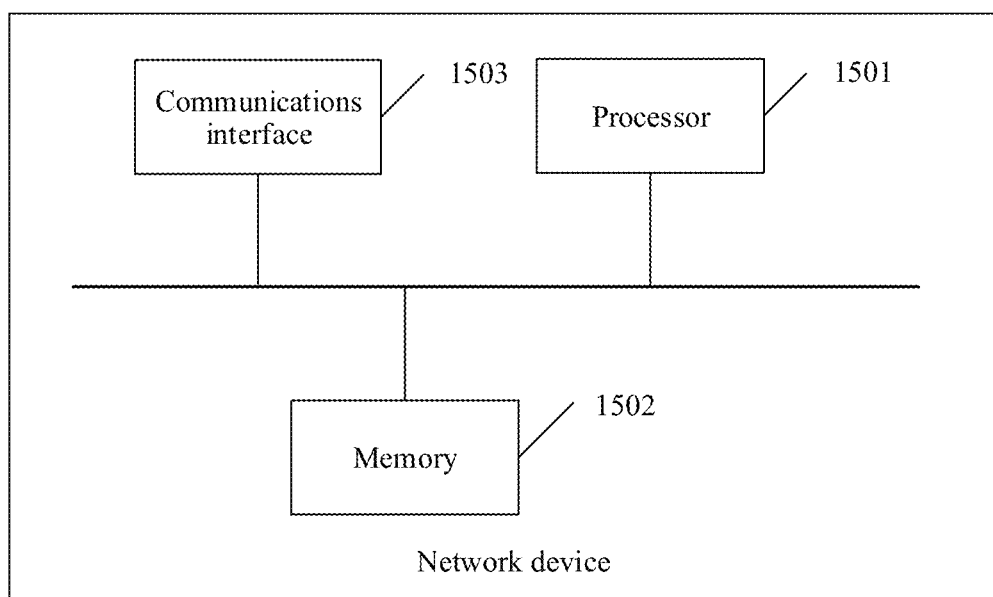
FIG. 15 is a schematic structural diagram of a network device according to an embodiment of this application.

FIG. 15 is a schematic structural diagram of a network device according to an embodiment of this application. As shown in FIG. 15, the network device 1500 includes a processor 1501, a memory 1502, and a communications interface 1503. The processor 1501, the memory 1502, and the communications interface 1503 are connected.

The processor 1501 may be a central processing unit (central processing unit, CPU), a general-purpose processor, a coprocessor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 1501 may be a combination of processors implementing a computing function, for example, a combination of one or more microprocessors, or a combination of the DSP and a microprocessor.

The communications interface 1503 is configured to implement communication with another network element (for example, a terminal device).

The processor 1501 invokes program code stored in the memory 1502, to perform the steps performed by the network device in the foregoing method embodiments.

Based on a same inventive concept, a problem-resolving principle of each device provided in the embodiments of this application is similar to that of the method embodiment of this application. Therefore, for implementation of the device, refer to the implementation of the method. For brevity, details are not described herein again.

It may be understood that when the embodiments of this application are applied to a terminal device chip, the terminal device chip implements a function of the terminal device in the foregoing method embodiments. The terminal device chip sends first information to another module (for example, a radio frequency module or an antenna) in the terminal device, or receives second information from another module in the network device. The first information is sent to a network device by using the another module in the terminal device, and the second information is sent by the network device to the terminal device. When the embodiments of this application are applied to a network device chip, the network device chip implements a function of the network device in the foregoing method embodiments. The network device chip receives first information from another module (for example, a radio frequency module or an antenna) in the network device, or sends second information to another module in the network device. The first information is sent by a terminal device to the network device, and the second information is sent to the terminal device. The first information and the second information herein are not a specific type of information, but are merely used to indicate a communication mode between the chip and the another module.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of this application are completely or partially generated. The computer may be a general-purpose computer, a dedicated computer, a computer network, or another programmable apparatus. The computer instructions may be stored in a computer-readable storage medium or may be transmitted via the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk (SSD)), or the like.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A communication method, applied to a terminal device, wherein the method comprises:
    obtaining first data and a quality of service (QoS) parameter corresponding to the first data, wherein the QoS parameter comprises at least one of reliability information, latency information, communication distance information, data rate information, or service type information, and wherein the first data is to be transmitted by the terminal device through a sidelink;

receiving a first message sent by a network device, wherein the first message comprises a plurality of correspondences between a plurality of identifiers and a plurality of QoS parameters, and each of the plurality of identifiers corresponds to one or more QoS parameters of the plurality of QoS parameters;

determining an identifier corresponding to the QoS parameter based on the plurality of correspondences between the plurality of identifiers and the plurality of QoS parameters; and sending the identifier to the network device.

2. The method according to claim 1, wherein the QoS parameter further comprises data priority information.

3. The method according to claim 1, wherein the sending the identifier to a network device comprises:

sending a buffer status report (BSR) to the network device, wherein the BSR comprises the identifier, and wherein:

the BSR further comprises a total data volume of all data that is in the terminal device and that corresponds to the identifier; or the BSR further comprises destination address information corresponding to at least one of the first data or a data volume of all data that is in the terminal device and that corresponds to both the destination address information and the identifier.

4. The method according to claim 3, wherein the method further comprises:

receiving scheduling resource information sent by the network device, wherein a scheduling resource corresponding to the scheduling resource information has at least one of a subcarrier spacing or a transmission time interval; and transmitting, through a sidelink by using the scheduling resource corresponding to the scheduling resource information, data corresponding to the identifier, wherein the at least one of the subcarrier spacing or the transmission time interval corresponds to the identifier.

5. The method according to claim 4, wherein the method further comprises:

receiving a second message sent by the network device, wherein the second message comprises a correspondence between the at least one of the subcarrier spacing or the transmission time interval and the identifier.

6. The method according to claim 1, wherein the terminal device is a vehicle or a vehicle-mounted device.

7. The method according to claim 1, wherein the QoS parameter comprises the communication distance information.

8. The method according to claim 1, wherein the identifier comprises a logical channel group identifier.

9. The method according to claim 1, wherein the identifier comprises a flow identifier.

10. The method according to claim 1, wherein the QoS parameter comprises the reliability information, the latency information, the communication distance information, the data rate information, and the service type information.

11. A terminal device, comprising:

a transceiver, the transceiver configured to receive a first message sent by a network device, wherein the first message comprises a plurality of correspondences between a plurality of identifiers and a plurality of quality of service (QoS) parameters, and each of the plurality of identifiers corresponds to one or more QoS parameters of the plurality of QoS parameters;

at least one processor;

one or more memories coupled to the at least one processor and storing programming instructions for execution by the at least one processor to:

obtain first data and a QoS parameter corresponding to the first data, wherein the QoS parameter includes at least one of reliability information, latency information, communication distance information, data rate information, or service type information, and wherein the first data is to be transmitted by the terminal device through a sidelink; and determine an identifier corresponding to the QoS parameter based on the plurality of correspondences between the plurality of identifiers and the plurality of QoS parameters; and wherein the transceiver is further configured to send the identifier to the network device.

12. The terminal device according to claim 11, wherein the QoS parameter further comprises data priority information.

13. The terminal device according to claim 11, wherein the transceiver is configured to send a buffer status report (BSR) to the network device, and wherein:

the BSR comprises the identifier, and the BSR further comprises a total data volume of all data that is in the terminal device and that corresponds to the identifier; or the BSR further comprises destination address information corresponding to at least one of the first data or a data volume of all data that is in the terminal device and that corresponds to both the destination address information and the identifier.

14. The terminal device according to claim 13, wherein the transceiver is further configured to:

receive scheduling resource information sent by the network device, wherein a scheduling resource corresponding to the scheduling resource information has at least one of a subcarrier spacing or a transmission time interval; and transmit, through a sidelink by using the scheduling resource corresponding to the scheduling resource information, data corresponding to the identifier, wherein the at least one of the subcarrier spacing or the transmission time interval corresponds to the identifier.

15. The terminal device according to claim 14, wherein the transceiver is further configured to receive a second message sent by the network device, and wherein the second message includes a correspondence between the at least one of the subcarrier spacing or the transmission time interval and the identifier.

16. A network device, comprising:

a transceiver, the transceiver configured to:

send a first message to a terminal device, wherein the first message comprises a plurality of correspondences between a plurality of identifiers and a plurality of quality of service (QoS) parameters, and each of the plurality of identifiers corresponds to one or more QoS parameters of the plurality of QoS parameters; and receive an identifier from the terminal device;

at least one processor; and one or more memories coupled to the at least one processor and storing programming instructions for execution by the at least one processor to:

determine a QoS parameter corresponding to first data to be transmitted by the terminal device through a sidelink, wherein the QoS parameter corresponds to the identifier and is determined based on the plurality of correspondences between the plurality of identifiers and the plurality of QoS parameters, and wherein the QoS parameter comprises at least one of reliability information, latency information, communication distance information, data rate information, or service type information.

17. The network device according to claim 16, wherein the QoS parameter further includes data priority information.

18. The network device according to claim 16, wherein the transceiver is configured to receive a buffer status report (BSR) from the terminal device, wherein the BSR comprises the identifier, and wherein:
the BSR further comprises a total data volume of all data that is in the terminal device and that corresponds to the identifier; or
the BSR further comprises destination address information corresponding to at least one of first data or a data volume of all data that is in the terminal device and that corresponds to both the destination address information and the identifier.

19. The network device according to claim 18, wherein the transceiver is further configured to send scheduling resource information to the terminal device, and wherein a scheduling resource corresponding to the scheduling resource information has at least one of a subcarrier spacing or a transmission time interval.

20. The network device according to claim 19, wherein the transceiver is further configured to send a second message to the terminal device, and wherein the second message includes a correspondence between the at least one of the subcarrier spacing or the transmission time interval and the identifier.

* * * * *